(12) United States Patent
Brack et al.

(10) Patent No.: US 7,671,164 B2
(45) Date of Patent: Mar. 2, 2010

(54) ALIPHATIC POLYCARBONATES, METHODS OF MAKING, AND ARTICLES FORMED THEREFROM

(75) Inventors: Hans-Peter Brack, Herrliberg (CH); Maarten Antoon Jan Campman, Churra-Murcia (ES); Jorge Garcia Agudo, Murcia (ES); Jan Henk Kamps, Bergen op Zoom (NL); Hans Looij, Bergen op Zoom (NL); Fernando Olmedo Fernandez, Cartagena (ES); Dennis James Patrick Maria Willemse, Standdaarbuiten (NL)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 12/124,583

(22) Filed: May 21, 2008

(65) Prior Publication Data
US 2009/0105443 A1  Apr. 23, 2009

Related U.S. Application Data

(63) Continuation-in-part of application No. 11/874,871, filed on Oct. 18, 2007.

(51) Int. Cl.
*C08G 63/00* (2006.01)
*C08G 63/02* (2006.01)

(52) U.S. Cl. .................. 528/190; 264/176.1; 264/219; 524/502; 528/176; 528/193; 528/196; 528/198; 548/472

(58) Field of Classification Search .............. 264/176.1, 264/219; 524/502; 528/176, 190, 193, 196, 528/198; 548/472
See application file for complete search history.

(56) References Cited

U.S. PATENT DOCUMENTS 4,506,066 A    3/1985  Medem et al.

7,132,498 B2 * 11/2006 McCloskey et al. ......... 528/196
7,138,479 B2   11/2006 Dhara et al.
7,485,694 B2 *  2/2009 Davis et al. ................. 528/196
7,485,695 B2 *  2/2009 Davis et al. ................. 528/196

FOREIGN PATENT DOCUMENTS

GB       1079686       8/1967

OTHER PUBLICATIONS

Kricheldorf, et al., "Polymers of Carbonic Acid, 22. Cholestreric Polycarbonates Derived From (S)-((2-Methylbutyl) hydroquinone or Isosorbide," Macromolecules 1996, vol. 29, pp. 8077-8082.
ASTM Designation: D 1003-00, "Standard Test Method for Haze and Luminous Transmittance of Transparent Plastics," pp. 1-6, 2000.
ASTM Designation: D 1238-04c, "Standard Test Method for Melt Flow Rates of Thermoplastics by Extrusion Plastometer," pp. 1-14, 2004.

\* cited by examiner

*Primary Examiner*—Terressa M Boykin

(57) ABSTRACT

A method of making a polycarbonate is described. The method comprises melt reacting an ester-substituted diaryl carbonate and a multifunctional compound of the formula:

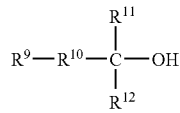

in the presence of catalyst to form an oligomer comprising less than 2,000 ppm of an ester-linked terminal group, and melt polymerizing the oligomer to form a polycarbonate. Use of specific reaction conditions produces a polycarbonate having an Mw of greater than or equal to 25,000 g/mol as determined by gel-permeation chromatography relative to polystyrene standards. Polycarbonates comprising units derived from the multifunctional compound, including homopolycarbonates, aliphatic copolycarbonates further comprising units derived from an aromatic dihydroxy compound, and aliphatic polycarbonate-polyesters, are also disclosed, as are a thermoplastic composition and an article including the disclosed polycarbonates.

30 Claims, 12 Drawing Sheets

ALIPHATIC POLYCARBONATES, METHODS OF MAKING, AND ARTICLES FORMED THEREFROM

CROSS REFERENCE TO RELATED APPLICATION

This application is a continuation-in-part of U.S. patent application Ser. No. 11/874,871 filed on Oct. 18, 2007, which is incorporated by reference herein in its entirety.

BACKGROUND

This disclosure relates to polycarbonates derived from aliphatic compounds, and in particular to polycarbonates derived from an aliphatic diol, methods of manufacture thereof, and articles comprising the polycarbonates.

Polycarbonate homopolymers and copolymers derived from aliphatic diols, particularly isosorbides (i.e., 2,6-dioxabicyclo[3.3.0]octane-4,8-diol and isomers thereof), are of great interest to the chemical industry because aliphatic diols can be produced from renewable resources, namely sugars, rather than from petroleum feed stocks. However, there are particular challenges associated with producing polycarbonates from aliphatic diols such as isosorbide.

The primary commercial method for preparing polycarbonates is by interfacial polymerization in a methylene chloride/water mixture using phosgene and alkali. Interfacial processes for producing isosorbide homopolycarbonate in pyridine-containing solvent mixtures at low temperatures have been described by Kricheldorf et al. in *Macromolecules* vol. 29, p. 8077 (1996). Kricheldorf et al. describe the preparation of isosorbide homopolycarbonate by converting isosorbide to the bischloroformate, followed by interfacial polymerization. The polymer obtained exhibited a $T_g$ of 144 to 155° C. However, pyridine is not a suitable solvent for large-scale processes. In addition, U.S. Pat. No. 4,506,066 discloses attempts to prepare copolycarbonates derived from isosorbide and bisphenol A by interfacial polymerization in an alkaline water/methylene chloride mixture with phosgene. Only bisphenol A polycarbonate was obtained and no incorporation of isosorbide was observed. It is theorized that interfacial methods are not commercially suitable for preparing homopolycarbonate derived from aliphatic diols, such as isosorbide, because the higher diol solubility in water impedes interphase transfer and the acidity of the diol protons is too low for the polymerization to proceed at an adequate rate in pH ranges suitable for commercial-scale interfacial phosgenation.

Another method of synthesizing polycarbonates is by melt polymerization, for example by melt transesterification of a dihydroxy compound with a source of carbonate units, such as diphenyl carbonate (DPC), in the presence of a catalyst and the absence of solvent. GB 1,079,686 discloses preparation of isosorbide homopolycarbonate by melt transesterification with DPC in the absence of a catalyst. DE 3,002,276 describes the preparation of lower molecular weight oligomers of copolycarbonates by the reaction of isosorbide with bisphenol A, 4,4'-dihydroxydiphenyl sulfide, or 4,4'-dihydroxy biphenyl and DPC using a disodium salt of bisphenol A as a transesterification catalyst. The phenyl carbonate terminal groups of the oligomers were then hydrolyzed and interfacially polymerized to produce high molecular weight copolycarbonates. U.S. Pat. No. 4,506,066 describes the melt polymerization of isosorbide with DPC at 220° C. to produce a pale brown polymer along with insoluble constituents. In this study it was presumed that during melt polymerization branching had occurred, leading to the formation of an insoluble inhomogeneous product. Thus, it was concluded that one-step melt polymerization processes are not suitable for the preparation of isosorbide homo- and copolycarbonates. A detailed polymerization study carried out by Kricheldorf et al. supports this conclusion, as one-step polymerization of isosorbide diphenyl carbonate with various diphenols catalyzed by ZnO was reported to only lead to the formation of products that were insoluble in all common solvents tested. *Macromolecules*, vol. 29, p. 8077 (1993).

U.S. Pat. No. 7,138,479 discloses an activated carbonate melt process to synthesize an isosorbide copolycarbonate having a random arrangement of structural units. Isosorbide homopolycarbonates having molecular weights (gel permeation chromatography, polystyrene standards) of 16,060 g/mol and 20,678 g/mol were obtained using non-activated and activated melt polymerization processes, respectively. However, such molecular weights are not sufficiently high for use in many, if not all, commercial applications.

Accordingly, there remains a need in the art for methods for the manufacture of high molecular weight homopolycarbonates and copolycarbonates derived from aliphatic diols, specifically isosorbide.

SUMMARY

The above-described and other deficiencies of the art are overcome by a method for the manufacture of an aliphatic polycarbonate, comprising melt reacting an ester-substituted diaryl carbonate of the formula:

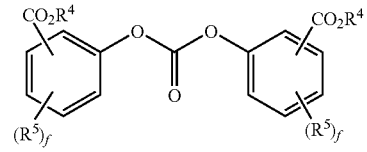

wherein each $R^4$ is independently a $C_{1-20}$ aliphatic group, $C_{4-20}$ cycloaliphatic group, or $C_{4-20}$ aromatic group, each $R^5$ is independently a halogen atom, cyano group, nitro group, $C_{1-20}$ aliphatic group, $C_{4-20}$ cycloaliphatic group, or $C_{6-18}$ aromatic group, and each f is independently 0 to 4, with a first multifunctional compound of the formula:

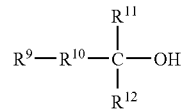

wherein $R^{10}$ is a chemical bond, a $C_{1-40}$ hydrocarbon that can be unsubstituted or substituted with a hydroxy, carboxy, $C_1$-$C_{22}$ alkoxycarbonyl, halogen, $C_{2-20}$ olefin, $C_{1-20}$ alkylether, or $C_{4-30}$ polyoxyalkylene in which the alkylene groups each independently comprise 2 to 6 carbon atoms, $R^{11}$ and $R^{12}$ are each independently a hydrogen or a $C_{1-40}$ hydrocarbon that can be unsubstituted or substituted with a hydroxyl, carboxy, $C_{1-22}$ alkoxycarbonyl, halogen, $C_{2-20}$ olefin, $C_{1-20}$ alkylether, or $C_{4-30}$ polyoxyalkylene functionality in which the alkylene groups contain 2 to 6 carbon atoms, and optionally wherein at least two of $R^{10}$, $R^{11}$, and $R^{12}$ together form a $C_{2-40}$ monocyclic, bicyclic, or tricyclic ring system optionally substituted with a heteroatom in a ring, and $R^9$ is a hydroxy or $C_{1-22}$ alkoxycarbonyl group; to form a first oligomer having a weight average molecular weight of 4,000 to 12,000 g/mol, measured using gel permeation chromatography using polystyrene standards, and comprising less than 2,000 ppm, as determined by $^1$H NMR, of an ester-linked terminal group of the formula:

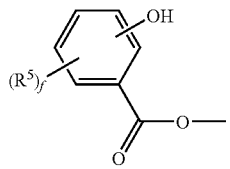

wherein each $R^5$ is independently a halogen atom, cyano group, nitro group, $C_{1-20}$ aliphatic group, $C_{4-20}$ cycloaliphatic group, or $C_{6-18}$ aromatic group, and f is 0 to 4; and melt polymerizing the first oligomer in the presence of a basic catalyst to form a polycarbonate.

In another embodiment a polycarbonate manufactured by the above method is disclosed.

Also disclosed is an article comprising the polycarbonate manufactured by the above method.

In addition, an aliphatic polycarbonate is disclosed, comprising units of the formula

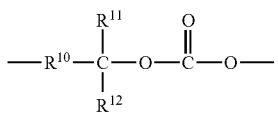

wherein $R^{10}$ is a chemical bond, a $C_{1-40}$ hydrocarbon that can be unsubstituted or substituted with a hydroxy, carboxy, $C_1$-$C_{22}$ alkoxycarbonyl, halogen, $C_{2-20}$ olefin, $C_{1-20}$ alkylether, or $C_{4-30}$ polyoxyalkylene in which the alkylene groups each independently comprise 2 to 6 carbon atoms, $R^{11}$ and $R^{12}$ are each independently a hydrogen or a $C_{1-40}$ hydrocarbon that can be unsubstituted or substituted with a hydroxyl, carboxy, $C_{1-22}$ alkoxycarbonyl, halogen, $C_{2-20}$ olefin, $C_{1-20}$ alkylether, or $C_{4-30}$ polyoxyalkylene functionality in which the alkylene groups contain 2 to 6 carbon atoms, and optionally wherein at least two of $R^{10}$, $R^{11}$, and $R^{12}$ together form a $C_{2-40}$ monocyclic, bicyclic, or tricyclic ring system form a $C_{2-40}$ monocyclic, bicyclic, or tricyclic ring system optionally substituted with a heteroatom in a ring; and an ester-linked terminal group of the formula:

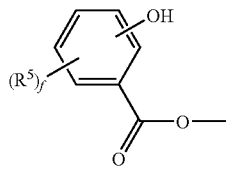

wherein each $R^5$ is independently a halogen atom, cyano group, nitro group, $C_{1-20}$ aliphatic group, $C_{4-20}$ cycloaliphatic group, or $C_{6-18}$ aromatic group, and f is 0 to 4, in amount of up to 2,000 ppm as determined by $^1$H NMR, and based on the parts by weight of the aliphatic polycarbonate.

Figure 1:
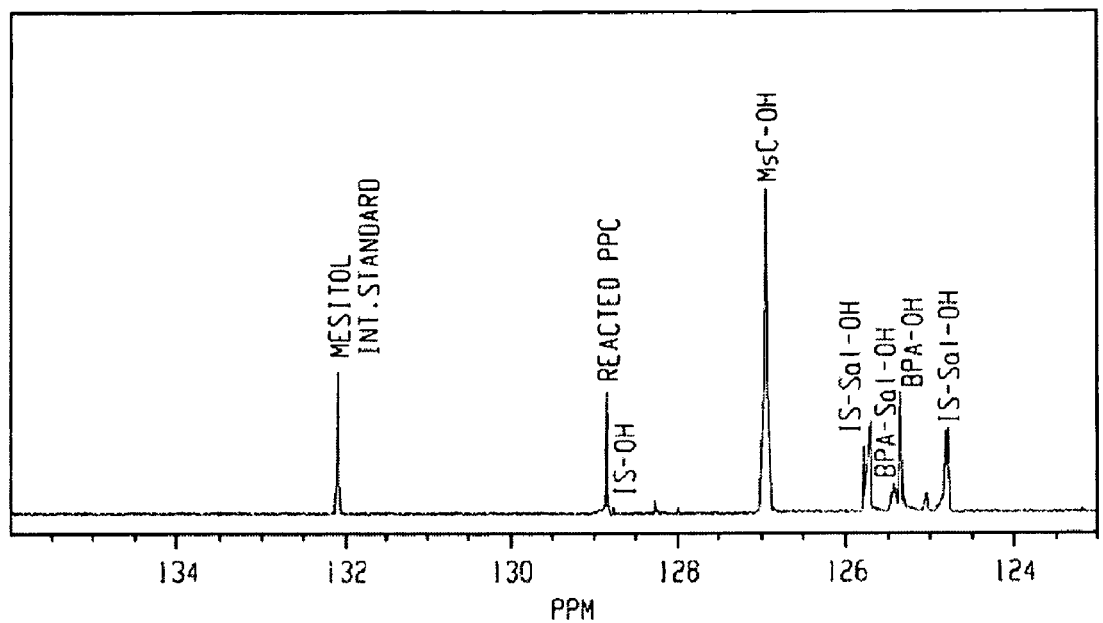
FIG. 1 is a $^{31}$P NMR spectrum of an aliphatic polycarbonate oligomer.

The above described and other features are exemplified by the following detailed description.

DETAILED DESCRIPTION

Described herein are methods for preparing aliphatic polycarbonates, particularly aliphatic polycarbonates with high levels of residues derived from an aliphatic diol monomer such as isosorbide. Surprisingly, it has been observed that a high molecular weight (i.e., weight average molecular weight of greater than 25,000 g/mol, measured by gel permeation chromatography (GPC) using polystyrene standards) aliphatic polycarbonate can be efficiently prepared by a melt polymerization method using an activated carbonate source in the presence of a catalyst, provided that the formation of a specific chain-stopping terminal group is controlled during the oligomerization stage of the manufacturing process. The molecular weight of the aliphatic polycarbonate is significantly higher than can be achieved for a comparable polymer prepared without control of the formation of the chain-stopping terminal group. The aliphatic polycarbonate has properties that are comparable with those of aromatic polycarbonates, including impact strength, transparency, surface properties, moldability, ductility, and the like. In addition, the aliphatic polycarbonate has other advantageous properties, such as biodegradability, improved scratch resistance, impact strength, and transparency, and are particularly useful in high use exterior applications.

As used herein, the term "aliphatic polycarbonate" includes homopolycarbonates and copolycarbonates having repeating structural carbonate units of formula (1):

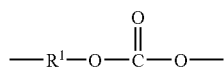

(1)

wherein all or a portion of the $R^1$ groups are derived from a $C_{1-60}$ aliphatic multifunctional compound, in particular an aliphatic diol. As used herein, "aliphatic" means unsaturated compounds that comprise carbon and hydrogen, and can optionally include a heteroatom, in particular a halogen, oxygen, nitrogen, sulfur, silicon, and phosphorus. More than one heteroatom can be present. Where only a portion of the $R^1$ units is derived from an aliphatic multifunctional compound, the remainder is derived from an aromatic dihydroxy compound as described in detail below.

In particular, the aliphatic polycarbonate is derived from a multifunctional compound of formula (2):

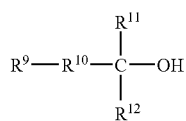

(2)

wherein $R^{10}$ is a chemical bond, a $C_{1-40}$ hydrocarbon that can be unsubstituted or substituted with a hydroxy, carboxy, $C_1$-$C_{22}$ alkoxycarbonyl, halogen, $C_{2-20}$ olefin, $C_{1-20}$ alkylether, or $C_{4-30}$ polyoxyalkylene in which the alkylene groups each independently comprise 2 to 6 carbon atoms, $R^{11}$ and $R^{12}$ are each independently a hydrogen or a $C_{1-40}$ hydrocarbon that can be unsubstituted or substituted with a hydroxyl, carboxy, $C_{1-22}$ alkoxycarbonyl, halogen, $C_{2-20}$ olefin, $C_{1-20}$ alkylether, or $C_{4-30}$ polyoxyalkylene functionality in which the alkylene groups contain 2 to 6 carbon atoms, $R^9$ is a hydroxy or $C_{1-22}$ alkoxycarbonyl group, and optionally wherein at least two of $R^{10}$, $R^{11}$, and $R^{12}$ together form a $C_{2-40}$ monocyclic, bicyclic, or tricyclic ring system optionally substituted with a heteroatom in a ring.

More specifically, an aliphatic polycarbonate can be derived from a difunctional compound of formula (2) wherein $R^{10}$ is a chemical bond, a $C_{1-40}$ hydrocarbon that can be unsubstituted or substituted with a halogen, $C_{2-20}$ olefin, $C_{1-20}$ alkylether, or a $C_4$-$C_{30}$ polyoxyalkylene functionality in which the alkylene groups contain 2 to 6 carbon atoms; $R^{11}$ and $R^{12}$ are each independently a hydrogen or a $C_{1-40}$ hydrocarbon that can be unsubstituted or substituted with a halogen, $C_{2-20}$ olefin, $C_{1-20}$ alkylether, or a $C_{4-30}$ polyoxyalkylene functionality in which the alkylene groups contain 2 to 6 carbon atoms, and optionally wherein at least two of $R^{10}$, $R^{11}$, and $R^{12}$ together form a monocyclic, bicyclic, or tricyclic ring system optionally substituted with a heteroatom in a ring. In one aspect of this embodiment, $R^9$ is hydroxy.

Specific examples of aliphatic diols within the scope of formula (2) are ethylene glycol, 1,3-propanediol, 1,2-propanediol, 1,4-butanediol, 1,3-butanediol, 5-pentanediol, 1,6-hexanediol, 1,7-heptanediol, 1,10-decanediol, 1,2-cyclohexanediol, trans-1,2-cyclohexanediol, cis-1,2-cyclohexanediol, 1,4-cyclohexanedimethanol, isosorbide, and polypropylene glycol block copolymers, for example those available under the trade name PLURONICS.

The polycarbonate comprises carbonate units of formula (1) wherein all or a portion of the $R^1$ groups are derived from the aliphatic multifunctional compound of formula (2) to provide an aliphatic carbonate comprising aliphatic carbonate units of the formula (3):

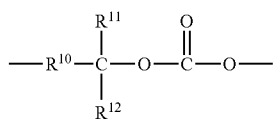

(3)

wherein $R_{10}$ is a chemical bond, a $C_{1-40}$ hydrocarbon that can be unsubstituted or substituted with a hydroxy, carboxy, $C_1$-$C_{22}$ alkoxycarbonyl, halogen, $C_{2-20}$ olefin, $C_{1-20}$ alkylether, or $C_{4-30}$ polyoxyalkylene in which the alkylene groups each independently comprise 2 to 6 carbon atoms, $R^{11}$ and $R^{12}$ are each independently a hydrogen or a $C_{1-40}$ hydrocarbon that can be unsubstituted or substituted with a hydroxyl, carboxy, $C_{1-22}$ alkoxycarbonyl, halogen, $C_{2-20}$ olefin, $C_{1-20}$ alkylether, or $C_{4-30}$ polyoxyalkylene functionality in which the alkylene groups contain 2 to 6 carbon atoms, and optionally wherein at least two of $R^{10}$, $R^{11}$, and $R^{12}$ together form a $C_{2-40}$ monocyclic, bicyclic, or tricyclic ring system optionally substituted with a heteroatom in a ring. More specifically, $R_{10}$ is a chemical bond, a $C_{1-40}$ hydrocarbon that can be unsubstituted or substituted with a halogen, $C_{2-20}$ olefin, $C_{1-20}$ alkylether, or a $C_4$-$C_{30}$ polyoxyalkylene functionality in which the alkylene groups contain 2 to 6 carbon atoms; $R^{11}$ and $R^{12}$ are each independently a hydrogen or a $C_{1-40}$ hydrocarbon that can be unsubstituted or substituted with a halogen, $C_{2-20}$ olefin, $C_{1-20}$ alkylether, or a $C_{4-30}$ polyoxyalkylene functionality in which the alkylene groups contain 2 to 6 carbon atoms, and optionally wherein $R^{10}$ and $R^{12}$ together form a monocyclic, bicyclic, or tricyclic ring system optionally substituted with a heteroatom in a ring.

In an exemplary embodiment, the aliphatic polycarbonate comprises aliphatic carbonate units of formula (4):

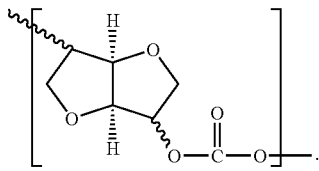

(4)

The aliphatic carbonate units of formula (4) can be derived from the corresponding aliphatic diol or a mixture of isomers of the aliphatic diol, also known as isosorbide.

In another embodiment, the aliphatic polycarbonate comprises aliphatic carbonate units of formula (5):

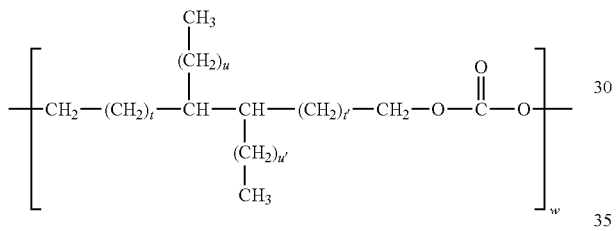

(5)

wherein t and t' are each independently 0 to 30, u and u' are each independently 0 to 30, the sum t+t'+u+u' is 30, and w is greater than or equal to 1. In another specific embodiment, a $C_{36}$ aliphatic carbonate unit has the structure of formula (5) wherein each t and t' is independently 5 to 10, each u and u' is independently 5 to 10, the sum t+t'+u+u' is 30, and w is greater than or equal to 1. More specifically, t and t' are independently 7 or 8, u and u' are independently 7 or 8, the sum t+t'+u+u' is 30, and w is greater than or equal to 1. For convenience, aliphatic, 36-carbon diols used to prepare these carbonate units are referred to herein as "C36 diols". C36 diols are commercially available under the trade name PRIPOL 2033 (CAS #147853-32-5).

Where only a portion of the $R^1$ units are derived from an aliphatic multifunctional compound, the remainder are units derived from a diol that differs from the aliphatic multifunctional compound, for example another type of aliphatic dihydroxy compound or an aromatic dihydroxy compound, such as a bisphenol. An exemplary dihydroxy aromatic compound is of formula (6):

HO-A$^1$-Y$^1$-A$^2$-OH      (6)

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclo-hexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (6) are bisphenol compounds of formula (7):

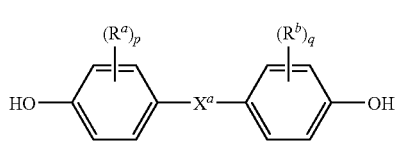

(7)

wherein $R^a$ and $R^b$ each represent a halogen atom or a monovalent hydrocarbon group and can be the same or different; p and q are each independently of 0 to 4; and $X^a$ represents a single bond or one of the groups of formulas (8) or (9):

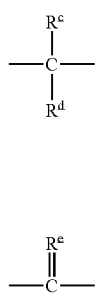

(8)

(9)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)-, where Z is a substituent group selected from the group consisting of hydrogen, hydroxy, $C_{1-12}$ alkyl, $C_{1-12}$ alkoxy, or $C_{1-12}$ acyl, and the like, and a combination comprising at least one of the foregoing substituent groups.

In a specific exemplary embodiment, $X^a$ is a substituted $C_{3-18}$ cycloalkylidene of formula (10):

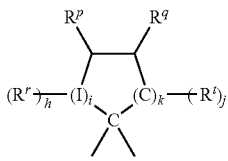

(10)

wherein each $R^r$, $R^p$, $R^q$, and $R^t$ is independently hydrogen, halogen, oxygen, or $C_{1-12}$ organic group; I is a bond, a carbon, or a divalent oxygen, sulfur, or —N(Z)- wherein Z is hydrogen, halogen, hydroxy, $C_{1-12}$ alkyl, $C_{1-12}$ alkoxy, or $C_{1-12}$ acyl; h is 0 to 2, j is 1 or 2, i is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (10) will have an unsaturated carbon-carbon linkage where the ring is fused. When k is 1 and i is 0, the ring as shown in formula (10) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. Exemplary aromatic dihydroxy compounds of this type include 3,3-bis(4-hydroxyphenyl)phthalimidine and 2-phenyl-3,3-bis(4-hydroxyphenyl)phthalimidine.

When k is 3 and i is 0, bisphenols containing substituted or unsubstituted cyclohexane units are used, for example bisphenols of formula (11):

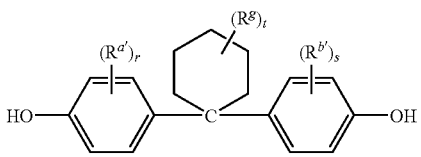

(11)

wherein substituents $R^{a'}$ and $R^{b'}$ can be aliphatic or aromatic, straight chain, cyclic, bicyclic, branched, saturated, or unsaturated, and $R^g$ is $C_{1-12}$ alkyl or halogen, r and s are independently 0 to 4, and t is an 0 to 10. It will be understood that hydrogen fills each valency when r is 0, s is 0, and t is 0. In one embodiment, each $R^{a'}$ and $R^{b'}$ is independently $C_{1-12}$ alkyl. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Exemplary cyclohexane-containing bisphenols of formula (11) where t is 3, r and s are 0, and $R^g$ is methyl include those derived from the reaction product of two moles of a phenol with one mole of a hydrogenated isophorone such as e.g., 3,3,5-trimethylcyclohexanone, are useful for making polycarbonates with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the APEC® trade name.

Some illustrative, non-limiting examples of bisphenol compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenyl-methane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (6) include 1,1-bis(4-hydroxyphenyl) methane, 1,1-bis(4-hydroxyphenyl) ethane, 2,2-bis(4-hydroxyphenyl)propane (hereinafter "bisphenol A" also known as "Bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine ("PPPBP"), and 9,9-bis(4-hydroxyphenyl) fluorene. Combinations comprising at least one of the foregoing dihydroxy aromatic compounds can also be used.

Small amounts of units derived from other types of dihydroxy compounds can be present in the aliphatic polycarbonate. For example, a small portion of the carbonate units can be derived from an aromatic dihydroxy compound of formula (12):

(12)

wherein each $R^f$ is independently $C_{1-12}$ alkyl, or halogen, and u is 0 to 4. It will be understood that $R^f$ is hydrogen when u is 0. In an embodiment, the halogen can be chlorine or bromine. In another embodiment, compounds of formula (12) in which the —OH groups are substituted meta to one another, and wherein $R^f$ and u are as described above, are also referred to herein as resorcinols. Examples of compounds that can be represented by the formula (12) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone; or combinations comprising at least one of the foregoing compounds.

The aliphatic polycarbonate can be a copolymer derived from a first multifunctional compound and a second multifunctional compound, both falling within the scope of formula (2), wherein the second multifunctional compound is different from the first multifunctional compound. A dihydroxy aromatic compound of formula (6) can optionally be present. The first multifunctional compound and the second multifunctional compound can be different aliphatic diols wherein $R^9$ is a hydroxy group, and no other hydroxy groups are present. Thus the first multifunctional compound provides aliphatic carbonate units as shown in formula (4) and the second multifunctional compound provides aliphatic carbonate units as shown in formula (5). In an exemplary embodiment, the first multifunctional compound is isosorbide, the second multifunctional compound is a C36 diol, and the optional aromatic dihydroxy compound is bisphenol A.

In another specific embodiment, the aliphatic polycarbonate is a copolymer derived from a multifunctional compound of formula (2), e.g., an aliphatic diol such as isorbide, and a dihydroxy aromatic compound of formula (6), e.g., bisphenol A. Thus, the polycarbonate is a copolymer comprising units derived from isosorbide and bisphenol A, in which each of $A^1$ and $A^2$ is p-phenylene and $Y^1$ is isopropylidene in formula (6). More specifically, at least 50%, specifically at least 70% of the $R^1$ groups in the polycarbonate are derived from isosorbide.

In one embodiment the aliphatic polycarbonate is linear. Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 weight percent (wt %). Mixtures comprising linear polycarbonates and branched polycarbonates can be used.

The relative amount of each type of carbonate unit present in the aliphatic polycarbonate will depend on the desired properties of the copolymer, and are readily ascertainable by one of ordinary skill in the art without undue experimentation, using the guidance provided herein. In an embodiment, the aliphatic polycarbonate comprises 1 to 100 mole percent (mol %), specifically 10 to 90 mol %, even more specifically 15 to 85 mol % of aliphatic carbonate units of formula (3), specifically carbonate units derived from isosorbide and/or a C36 diol, based on the total number of carbonate units in the aliphatic polycarbonate. The aliphatic polycarbonate can further comprise 0 to 99 mol %, specifically 10 to 90 mol %, even more specifically 15 to 85 mol % of different carbonate units. In an embodiment, each of the different carbonate units is derived from the dihydroxy aromatic compound of formula (6). In another embodiment, the aliphatic polycarbonate is a copolymer comprising of 50 to 99 mol %, specifically 65 to 95 mol %, more specifically 70 to 90 mol %, of aliphatic carbonate units of formula (3), with the remainder of the carbonate units being derived from a dihydroxy aromatic compound of formula (6)

In a specific embodiment, the aliphatic polycarbonate is a homopolymer consisting essentially of, or consisting of, carbonate units derived from a multifunctional compound of formula (2), specifically isosorbide or a C36 diol. In another embodiment, the aliphatic polycarbonate is a copolymer consisting essentially of, or consisting of, units derived from two different multifunctional compounds of formula (2), in particular isosorbide and a C36 diol. In still another embodiment, a copolymer of formula (13) consists essentially of, or consists of, carbonate units derived from an aliphatic multifunctional compound of formula (2) and carbonate units derived from an aromatic dihydroxy compound:

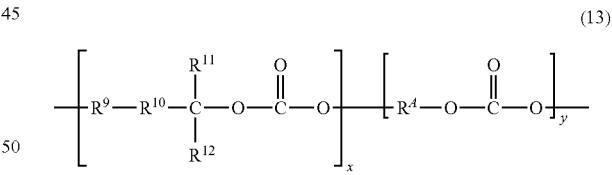

(13)

wherein the $R^A$ groups are derived from a dihydroxy aromatic compound of formula (6), $R^{10}$, $R^{11}$ and $R^{12}$ are as defined above, and the mole percent ratio of carbonate units x to y is 1:100 to 100:1, specifically 50:50 to 100:1, specifically 60:40 to 90:10, and more specifically 70:30 to 85:15.

Each of the foregoing mole percents for formula (13) is based on the total moles of carbonate units. In an embodiment, where the aliphatic polycarbonate of formula (13) is derived from a multifunctional compound of formula (2) and a dihydroxy aromatic compound of formula (6), the mole percents are based on the total moles of multifunctional compound of formula (2) and dihydroxy aromatic compound of formula (6) used to manufacture the aliphatic polycarbonate. In another specific embodiment, only multifunctional compounds that fall within the scope of formula (2) and dihydroxy aromatic compounds that fall within the scope of formula (6) are used.

The aliphatic polycarbonate can further be a copolymer comprising carbonate units and other types of polymer units, such as ester units, polysiloxane units, and combinations comprising at least one of homopolycarbonates and copolycarbonates. A specific type of polycarbonate copolymer of this type is an aliphatic polycarbonate-polyester, also known as an aliphatic polycarbonate-ester. Aliphatic polycarbonate-polyesters further contain, in addition to recurring carbonate units of formula (1), carbonate units derived from oligomeric ester-containing dihydroxy compounds (also referred to herein as hydroxy end-capped oligomeric esters) comprising repeating units of formula (14):

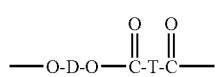

(14)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T is a divalent group derived from a dicarboxylic acid, for example, a $C_{2-120}$ alkylene group, a $C_{6-20}$ alicyclic group, a $C_{6-20}$ alkyl aromatic group, or a $C_{6-20}$ aromatic group.

In an embodiment, D is a $C_{2-30}$ alkylene group having a straight chain, branched chain, or cyclic (including polycyclic) structure. In an embodiment, D is a group derived from a multifunctional compound of formula (2) wherein $R^9$ is hydroxy. In another embodiment, D is derived from an aromatic dihydroxy aromatic compound of formula (7) above. In another embodiment, D is derived from a dihydroxy aromatic compound of formula (11) above.

Exemplary aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Exemplary dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof.

The number of ester units of formula (14) in the aliphatic polycarbonate-polyesters can be 4 to 100, specifically 5 to 90, and more specifically greater than or equal to 8 to 70. In a specific embodiment, the number of ester units of formula (14) in an aliphatic polycarbonate-polyester is 4 to 50, specifically 5 to 30, more specifically 8 to 25, and still more specifically 10 to 20. The molar ratio of ester units to carbonate units in the aliphatic polycarbonate-polyesters can vary broadly, for example 1:99 to 99:1, specifically 10:90 to 90:10, more specifically 25:75 to 75:25, depending on the desired properties of the final composition.

In an embodiment, the polyester units of the aliphatic polycarbonate-polyester are derived from the reaction of a combination of isophthalic and terephthalic dicarboxylic acid (or derivatives thereof) with resorcinol. In another specific embodiment, the polyester unit of the aliphatic polycarbonate-polyester is derived from the reaction of a combination of isophthalic acid and terephthalic acid with bisphenol A. In a specific embodiment, the carbonate units of the aliphatic polycarbonate-polyester is derived from a multifunctional compound of formula (2), optionally together with resorcinol and/or bisphenol A, and the polyester unit of the aliphatic polycarbonate-polyester is derived from the reaction of a combination of isophthalic acid and terephthalic acid with bisphenol A.

In another embodiment, the polyester unit of the aliphatic polycarbonate-polyester is derived from the multifunctional compound of formula (2) as described above, and a $C_{2-13}$ aliphatic dicarboxylic acid or derivative thereof from which T in formula (14) is derived. Such dicarboxylic acids are also referred to as an alpha-omega diacids, and can be derived from natural sources, or from condensation of readily available feedstock. The $C_{2-13}$ aliphatic dicarboxylic acid can be straight chain or branched, and can contain a cyclic group. Exemplary aliphatic dicarboxylic acid include oxalic acid, 1,4-propanedioic acid, 1,4-butanedioic acid, 1,6-hexanedioic acid, 1,8-octanedioic acid, 1,10-decanedioic acid, and 1,12-dodecanedioic acid (DDDA). Dodecanedioic acid (the alpha-omega isomer, also referred to as the 1,12-isomer) can be specifically mentioned. Dodecanedioc acid is a commonly available alpha-omega diacid, and includes the diacids derived from oligomers of butadiene. Such a $C_{12}$ aliphatic dicarboxylic acid (which comprises a $C_{10}$ alkylene chain connecting two carboxylic acid terminal groups) is derived industrially from Ni-catalyzed cyclotrimerization of butadiene, hydrogenation to form cyclododecane, and is followed by ring opening oxidation to form the dodecanedioic acid.

In still another embodiment, the polyester unit of an aliphatic polycarbonate-polyester is derived from the aliphatic diol of formula (2) as described above, and a $C_{36}$ aliphatic dicarboxylic acid or derivative thereof from which T in formula (14) is derived. Such $C_{36}$ aliphatic dicarboxylic acids have formula (15):

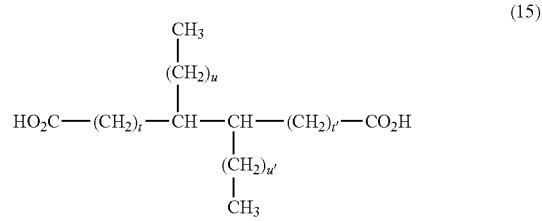

(15)

wherein t and t' are each independently 0 to 30, u and u' are each independently 0 to 30, the sum t+t'+u+u' is 30, and w is greater than or equal to 1. In another specific embodiment, a $C_{36}$ aliphatic dicarboxylic acid has the structure of formula (15) wherein each t and t' is independently 5 to 10, each u and u' is independently 5 to 10, the sum t+t'+u+u' is 30, and w is greater than or equal to 1. More specifically, t and t' are independently 7 or 8, u and u' are independently 7 or 8, the sum t+t'+u+u' is 30, and w is greater than or equal to 1. For convenience, such aliphatic dicarboxylic acids are referred to herein as "C36 diacids." C36 diacids are commercially available under the trade name PRIPOL 1009.

In an embodiment, polyester units in formula (14) are derived from the reaction product of the multifunctional compound of formula (2) and an aliphatic dicarboxylic acid such as DDDA or a C36 diacid of formula (15). The resulting structural unit corresponds to a polyester unit of formula (16):

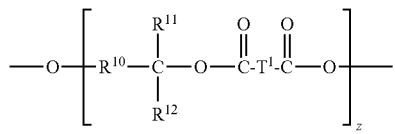

(16)

wherein $R_{10}$, $R^{11}$, and $R^{12}$ are as described above, $T^1$ is a residue derived from DDDA or the C36 diacid of formula (15), and z is an integer from 4 to 100, specifically 5 to 90, and more specifically greater than or equal to 8 to 70. In a specific embodiment, z is 4 to 50, specifically 5 to 30, more specifically 8 to 25, and still more specifically 10 to 20.

Polyester units of formula (14) can be derived from the reaction of the multifunctional compound of formula (2) wherein $R^9$ is hydroxy, and a dicarboxylic acid of formula $T(CO_2H)_2$ prepared in situ during melt polymerization of the multifunction compound and the dicarboxylic acid in the presence of an activated carbonate source. For example, isosorbide and a C36 diacid of formula (15), can be prepared in situ during melt polymerization of isosorbide and the C36 diacid in the presence of a carbonate source, and in particular an activated carbonate source such as an ester-substituted diaryl carbonate, to produce ester units of formula (14) in which D corresponds to the bicyclo [3.3.0] ring structure of isosorbide and T corresponds to the $C_{36}$ alkylene chain that connects the two carboxyl terminal groups of the diacid of formula (15). In yet another example, ester units of formula (14) (in which D corresponds to the bicyclo [3.3.0] ring structure of isosorbide and T corresponds to the $C_{10}$ alkylene chain that connects the two carboxyl terminal groups of the DDDA), can be derived from the reaction of isosorbide and DDDA prepared in situ during melt polymerization of isosorbide and DDDA in the presence of an activated carbonate source.

The resulting polyester units in these two embodiments correspond to a polyester unit of formula (17):

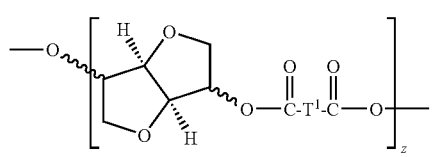

(17)

wherein $T^1$ is a residue derived from DDDA or the C36 diacid of formula (15), and z is greater than 1.

In an embodiment, the aliphatic polycarbonate-polyester comprises aliphatic carbonate units of formula (3) and ester units of formula (16), to provide aliphatic polycarbonate-polyesters of formula (18):

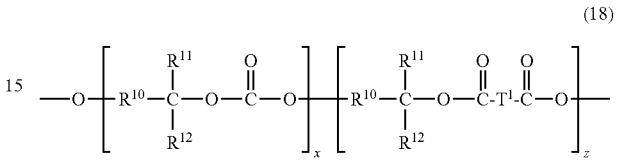

(18)

wherein $R^{10}$, $R^{11}$, $R^{12}$, and $T^1$ are as described above, and the molar ratio of x to z is 50:50 to 99:1, specifically 60:40 to 98:2, more specifically 70:30 to 97:3, still more specifically 80:20 to 96:4, and still yet more specifically 85:15 to 95:5. In another specific embodiment, the aliphatic polycarbonate-polyester is derived from aliphatic carbonate units of formula (4), ester units of formula (17), and carbonate units of formula (1), to provide aliphatic polyester polycarbonates of formula (19):

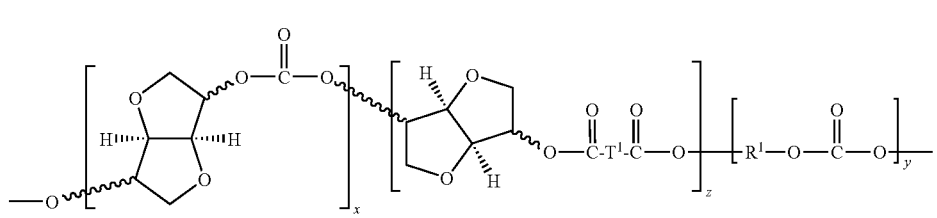

(19)

wherein $T^1$ is as described above, $R^1$ is not derived from isosorbide, and the molar ratio of x, y, and z are respectively 50-98:1-30:1-20, specifically 60-96:2-25:2-15, more specifically 70-97:2-20:2-10, and still more specifically 80-96:2-15:2-5.

In still another embodiment, an aliphatic polycarbonate comprising ester units can be derived from the reaction of a multifunctional compound of formula (2) and a multifunctional compound of formula (20) in the presence of an activated carbonate:

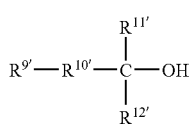

(20)

wherein

R$^{10'}$ is a chemical bond, a C$_{1-40}$ hydrocarbon that can be unsubstituted or substituted with a hydroxy, carboxy, C$_1$-C$_{22}$ alkoxycarbonyl, halogen, C$_{2-20}$ olefin, C$_{1-20}$ alkylether, or C$_{4-30}$ polyoxyalkylene in which the alkylene groups each independently comprise 2 to 6 carbon atoms, R$^{11'}$ and R$^{12'}$ are each independently a hydrogen or a C$_{1-40}$ hydrocarbon that can be unsubstituted or substituted with a hydroxyl, carboxy, C$_{1-22}$ alkoxycarbonyl, halogen, C$_{2-20}$ olefin, C$_{1-20}$ alkylether, or C$_{4-30}$ polyoxyalkylene functionality in which the alkylene groups contain 2 to 6 carbon atoms, R$^{9'}$ is a carboxy group, and optionally wherein at least two of R$^{10'}$, R$^{11'}$, and R$^{12'}$ together form a C$_{2-40}$ monocyclic, bicyclic, or tricyclic ring system optionally substituted with a heteroatom in the ring.

More specifically, an aliphatic polycarbonate can be derived from reaction of a multifunctional compound of formula (2) and a carboxy compound of formula (20) in the presence of an activated carbonate wherein R$^{10'}$ is a chemical bond, a C$_{1-40}$ hydrocarbon that can be unsubstituted or substituted with a halogen, C$_{2-20}$ olefin, C$_{1-20}$ alkylether, or a C$_4$-C$_{30}$ polyoxyalkylene functionality in which the alkylene groups contain 2 to 6 carbon atoms; R$^{11'}$ and R$^{12'}$ are each independently a hydrogen or a C$_{1-40}$ hydrocarbon that can be unsubstituted or substituted with a halogen, C$_{2-20}$ olefin, C$_{1-20}$ alkylether, or a C$_{4-30}$ polyoxyalkylene functionality in which the alkylene groups contain 2 to 6 carbon atoms, and optionally wherein at least two of R$^{10'}$, R$^{11'}$, and R$^{12'}$ together form a monocyclic, bicyclic, or tricyclic ring system optionally substituted with a heteroatom in a ring. The multifunctional compound of formula (2) can be an isorbide.

The multifunctional carboxy compound of formula (20) can be used in any combination with the foregoing multifunctional compounds of formula (2), optionally in further combination with a dihydroxy aromatic compound of formula (6) and/or a dicarboxylic acid of the formula T(CO$_2$H)$_2$ and/or T$^1$(CO$_2$H)$_2$. In one embodiment, the multifunctional carboxy compound of formula (20) is used in combination with isosorbide and/or a C36 diol; optionally together with bisphenol A and/or a C$_{6-20}$ aromatic dicarboxylic acid or reactive derivative thereof; a C$_{2-13}$ aliphatic dicarboxylic acid or reactive derivative thereof; or a combination comprising at least one of the foregoing additional reactants.

The aliphatic polycarbonate is prepared in a melt polymerization process by co-reacting, in a molten state, the multifunctional compound of formula (2) and any dihydroxy aromatic reactant(s) of formula (6) with an ester-sustituted diaryl carbonate ester in the presence of a transesterification catalyst. The reaction can be carried out in commercial polymerization equipment, such as one or more continuously stirred tank reactors (CSTRs), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation, and the polymer is isolated as a molten residue.

The ester-substituted diaryl carbonate is of formula (21):

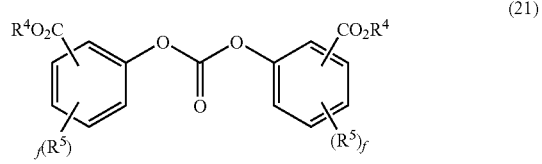

(21)

wherein each R$^4$ is independently a C$_{1-20}$ aliphatic group, C$_{4-20}$ cycloaliphatic group, or a C$_{4-20}$ aromatic group, and R$^5$ is independently a halogen atom, cyano group, nitro group, a C$_{1-20}$ aliphatic group, a C$_{4-20}$ cycloaliphatic group, or a C$_{4-20}$ aromatic group, and each f is independently 0 to 4. In one embodiment, at least one of the substituents —CO$_2$R$^4$ is attached in an ortho position of formula (21). A specific ester-substituted diaryl carbonate is bis(methylsalicyl)carbonate (CAS Registry No. 82091-12-1) (also known as BMSC or bis(o-methoxycarbonylphenyl)carbonate).

The melt polymerization is conducted in the presence of a transesterification catalyst comprising a first catalyst, also referred to herein as an alpha catalyst, the alpha catalyst comprising a metal cation and an anion. In an embodiment, the cation is derived from an alkali or alkaline earth metal, for example Li, Na, K, Cs, Rb, Mg, Ca, Ba, Sr, or a combination comprising at least one of the foregoing. The anion is hydroxide (OH$^-$), superoxide (O$^{2-}$), thiolate (HS$^-$), sulfide (S$_{2-}$), a C$_{1-20}$ alkoxide, a C$_{6-20}$ aryloxide, a C$_{1-20}$ carboxylate, a phosphate including bisphosphate, a C$_{1-20}$ phosphonate, a sulfate including bisulfate, sulfites including bisulfites and metabisulfites, a C$_{1-20}$ sulfonate, a carbonate including bicarbonate, or a combination comprising at least one of the foregoing. Salts of an organic acid comprising both alkaline earth metal ions and alkali metal ions can also be used. Salts of organic acids useful as catalysts are illustrated by alkali metal and alkaline earth metal salts of formic acid, acetic acid, stearic acid, and ethylenediamine tetra-acetic acid. The catalyst can also comprise the salt of a non-volatile inorganic acid. By "non-volatile" it is meant that the referenced compounds have no appreciable vapor pressure at ambient temperature and pressure. In particular, these compounds are not volatile at temperatures at which melt polymerizations of polycarbonate are conducted. The salts of non-volatile acids are alkali metal salts of phosphites; alkaline earth metal salts of phosphites; alkali metal salts of phosphates; and alkaline earth metal salts of phosphates. Exemplary transesterification catalysts include as salts hydroxides such as lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, Na$_2$HPO$_4$, NaH$_2$PO$_4$, Na$_2$HPO$_3$, NaH$_2$PO$_3$, NaH$_2$PO$_3$, Na$_2$HPO$_3$, NaHSO4, Na$_2$SO$_4$, Na$_2$H$_2$PO$_3$, KH$_2$PO$_4$, CsH$_2$PO$_4$, Cs$_2$H$_2$PO$_4$, Na$_2$SO$_3$, Na$_2$S$_2$O$_5$, sodium, mesylate, potassium mesylate, sodium tosylate, potassium tosylate, magnesium disodium ethylenediamine tetraacetate (EDTA magnesium disodium salt), or a combination comprising at least one of the foregoing salts. In an embodiment, less basic catalysts include polyacids partially neutralized by alkali hydroxides, specifically Na$_2$HPO$_4$, NaH$_2$PO$_4$, Na$_2$HPO$_3$, NaH$_2$PO$_3$, NaH$_2$PO$_3$, Na₂HPO₃, NaHSO4, Na₂SO₄, Na₂H₂PO₃, or a combination comprising at least one of the foregoing polyacids. It will be understood that the foregoing list is exemplary and should not be considered as limited thereto. In an embodiment, the transesterification catalyst is an alpha catalyst consisting essentially of an alkali metal salt. In a specific embodiment, the catalyst consists essentially of a sodium salt capable of providing a hydroxide ion upon exposure to moisture. In a more specific embodiment, the transesterification catalyst consists essentially of a sodium salt such as sodium oxide; sodium hydroxide; sodium bicarbonate; sodium carbonate; sodium alkoxides such as sodium methoxide, sodium ethoxide, sodium isopropoxide, sodium t-butoxide, sodium phenolate, or a combination comprising at least one of the foregoing salts. The sodium salt can generate sodium hydroxide upon exposure to moisture, or moisture and elevated temperatures as encountered during reaction and/or extrusion. An exemplary sodium salt for use as a transesterification catalyst is sodium hydroxide.

The alpha catalyst can be used in amounts of up to 1350 micromoles (μmol) per mole of dihydroxy compound(s), based on the scale of the reaction, specific details of the reaction profile (residence time, temperature, and pressure), and the potential presence of any quenching or deactivating impurities present in the reactants. In an embodiment, the amount of alpha catalyst can be 0.01 to 400 micromoles, specifically 0.01 to 80 micromoles, more specifically 0.1 to 40 micromoles, more specifically 0.5 to 20 micromoles, and still more specifically 1 to 19 micromoles, per mole of dihydroxy compound(s) (e.g., aliphatic diol and aromatic dihydroxy compound) present in the melt polymerization. In another embodiment, the alpha catalyst can be used in an amount of 6 to 75 micromoles per mole of dihydroxy compound(s) in production scale batch processes. In another embodiment, the alpha catalyst can be used in an amount of 75 to 150 micromoles per mole of dihydroxy compound(s) in production scale continuous operations (i.e., those having shorter residence times for the reactants). In addition, the minimum amount of alpha catalyst can be adjusted according to the sodium content of the reactants, where the number of equivalents of sodium (and present in the form of a reactive salt such as NaOH, Na₂CO₃, NaHCO₃) can be additive to the number of equivalents of alpha catalyst used, to provide a total alpha catalyst content for the polymerization reaction. The sodium content can be in any reactant, but in an embodiment is contributed specifically by the multifunctional compound of formula (2), even more specifically the isosorbide. In an embodiment, the total alpha catalyst is the sum of the equivalents of sodium plus the number of equivalents of alpha catalyst. The sodium level in the reactants can 0.4 to 10 ppm based on the total weight of the reactants, and can vary with the commercial source of the reactant.

In addition, a second transesterification catalyst, also known as a beta catalyst, can be included in the melt polymerization process, provided that the inclusion of the second transesterification catalyst does not significantly adversely affect the desirable properties of the aliphatic polycarbonate. Exemplary beta catalysts include phase transfer catalysts of formula (R³)₄Q⁺X, wherein each R³ is the same or different, and is a C₁₋₁₀ alkyl group; Q is a nitrogen or phosphorus atom; and X is a halogen atom or a C₁₋₈ alkoxy group or C₆₋₁₈ aryloxy group. Exemplary phase transfer catalyst salts include, for example, [CH₃(CH₂)₃]₄NX, [CH₃(CH₂)₃]₄PX, [CH₃(CH₂)₅]₄NX, [CH₃(CH₂)₆]₄NX, [CH₃(CH₂)₄]₄NX, CH₃[CH₃(CH₂)₃]₃NX, and CH₃[CH₃(CH₂)₂]₃NX, wherein X is Cl⁻, Br⁻, a C₁₋₈ alkoxy group or a C₆₋₁₈ aryloxy group. Exemplary beta catalysts include salts such as tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing salts. Other melt beta catalysts include alkaline earth metal salts or alkali metal salts. In some embodiments, the beta catalyst can be present in a molar ratio, relative to the alpha catalyst, of less than or equal to 10, specifically less than or equal to 5, more specifically less than or equal to 1, and still more specifically less than or equal to 0.5 moles of beta catalyst per mole alpha catalyst. In an embodiment, the melt polymerization reaction uses only an alpha catalyst as described above, and is substantially free of any beta catalyst. In a specific embodiment, the beta catalyst is present in an amount of less than 10 ppm, specifically less than 1 ppm, more specifically less than or equal to 0.1 ppm, and more specifically less than or equal to 0.01 ppm, and even more specifically less than or equal to 0.001 ppm, based on the total weight of all components used in the melt polymerization reaction.

A thermal stabilizer can be added during melt polymerization to mitigate or eliminate any potential degradation of the monomers (specifically, the aliphatic multifunctional compounds of formula (2)) during the melt polymerization. Specifically, where the aliphatic multifunctional compound is isosorbide, inclusion of a thermal stabilizer can reduce the degree of decomposition of the isosorbide and thereby provide a lower level of impurities, and lead to higher batch-to-batch consistency in the desired properties of the polycarbonate composition.

An end-capping agent (also referred to as a chain-stopper) can be used to limit molecular weight growth rate, and so control molecular weight in the polycarbonate. Exemplary chain-stoppers include certain monophenolic compounds (i.e., phenyl compounds having a single free hydroxy group). Phenolic chain-stoppers are exemplified by phenol and C₁-C₂₂ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

It has been observed that terminal groups in a polycarbonate can be derived from the carbonyl source in addition to any added end-capping groups. Thus, when an ester-substituted diaryl carbonate of formula (21) is used as the carbonate source, it has been observed that the terminal group can be an ester-linked terminal group of formula (22):

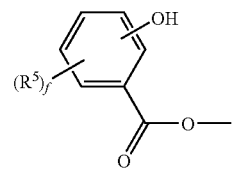

(22)

wherein each R⁵ is independently a halogen atom, cyano group, nitro group, C₁₋₂₀ aliphatic group, C₄₋₂₀ cycloaliphatic group, or C₆₋₁₈ aromatic group, and f is 0 to 4. When BMSC is used, f is zero and the hydroxyl group is ortho to the carboxy ester group as in formula (23):

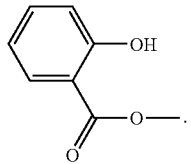
(23)

While not wanting to be bound by theory, a possible mechanism for the formation of the ester-linked terminal group is based on an observed ester-substituted aryl byproduct derived from the activated carbonate, for example the methyl ester-substituted byproduct as shown in formula (24):

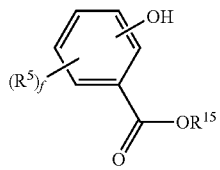
(24)

wherein $R^5$ and f are as defined above, and $R^{15}$ is a $C_{1-36}$ hydrocarbyl group, specifically methyl. Where BMSC is used as the activated carbonate, an ester-substituted aryl byproduct of formula (25) (methyl salicylate) can be formed:

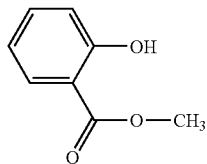
(25)

This byproduct can then react with the growing polymer chain to form an ester-linked terminal group, wherein the ester linkage can occur adjacent to a residue of a group used to form the backbone of the polymer, as shown in formula (26).

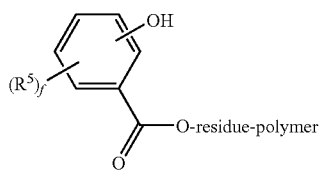
(26)

wherein $R^5$ and f are as defined above. The "residue" in formula (26) can be, for example, a residue derived from the multifunctional compound of formula (2), in particular an aliphatic diol wherein $R^9$ is hydroxy; a residue derived from the dihydroxy aromatic compound of formula (6) (when used); or a residue derived from a dicarboxylic acid (when used).

In an exemplary embodiment, as shown in Scheme (1), the ester-linked terminal group is adjacent to a group derived from a dihydroxy compound, wherein the dihydroxy compound is adjacent to a carbonate group:

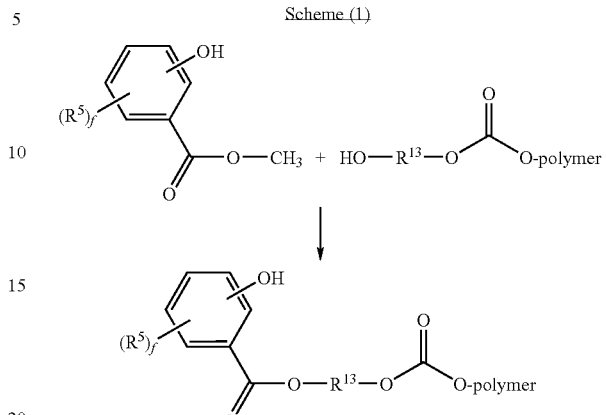
Scheme (1)

wherein $R^5$ and f in Scheme (1) are as defined above. $R^{13}$ in Scheme (1) can be a residue derived from the multifunctional compound of formula (2), in particular the aliphatic diol; or a residue derived from the dihydroxy aromatic compound of formula (6) (when used). A given composition comprising the aliphatic polycarbonate can contain polymers having residues derived from a combination of the multifunctional compound, in particular the aliphatic diol, and a residue derived from the aromatic dihydroxy compound. In one specific embodiment, $R^{13}$ is a residue derived from a $C_{1-60}$ aliphatic multifunctional compound, in particular an aliphatic diol that comprises carbon and hydrogen, and can optionally include one or more heteroatoms, in particular a halogen, oxygen, nitrogen, sulfur, silicon, and/or phosphorus. In another embodiment, $R^{13}$ is a residue derived from a dihydroxy aromatic compound of formula (6) as described above.

In a specific example, where isosorbide (27)

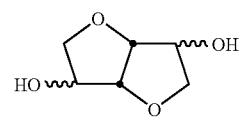
(27)

is used in the melt reaction, it has been observed that an ester-linked terminal group derived from the ester-substituted diaryl carbonate of formula (21) and a terminal isosorbide group having the structure of formula (28) is formed:

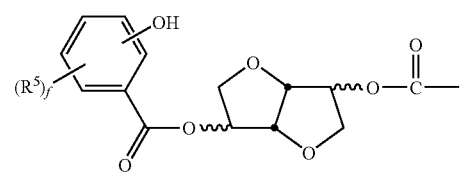
(28)

wherein $R^5$ and f are as defined above. Where BMSC is used as the carbonyl source and isosorbide is used as the aliphatic diol, it has been observed that an ester-linked terminal group is derived from a residue of BMSC and a terminal isosorbide group, and has the structure of formula (29):

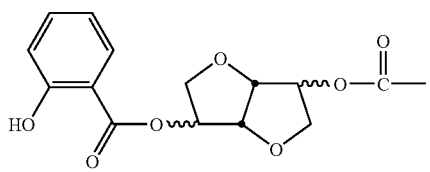

(29)

Similarly, where a C36 diol of formula (30)

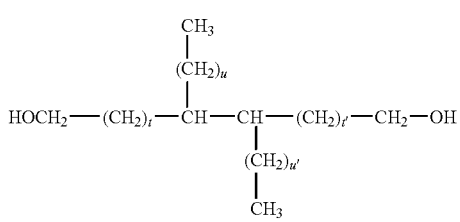

(30)

is used as the aliphatic diol in the melt reaction, an ester-linked terminal group derived from the ester-substituted diaryl carbonate of formula (21) and a C36 diol group, and having the structure of formula (31) can be formed:

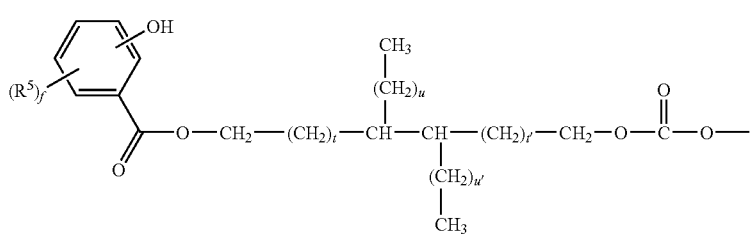

(31)

$R^5$, f, u, u', t, and t' in formulas (30) and (31) are as described above. Where BMSC is used as the carbonyl source, f in formula (31) is 0.

The ester-linked terminal groups described above have low reactivity, and thus can hinder chain growth and limit molecular weight. In addition it has been observed that the ester-linked terminal groups can form in high concentration when aliphatic multifunctional compounds, particularly diols, are used in the manufacture of polycarbonate. Therefore it has been discovered that limiting the formation of ester-linked terminal groups is beneficial if high molecular weight polymer is to be manufactured. In particular, it has been discovered that polycarbonates derived from an aliphatic multifunctional compound of formula (2) and having an Mw 25,000 g/mol or greater (as determined by GPC relative to polystyrene standards), can be manufactured if the formation of an ester-linked terminal group is limited during the manufacture of an intermediate oligomer that is subsequently polymerized to form high molecular weight polymer. Such oligomers typically have an Mw of 4,000 to 14,000 g/mol, specifically 5,000 to 12,000 g/mol, even more specifically 5,000 to 8,500 g/mol, as determined by GPC using polystyrene standards. The molecular weight of the oligomers can vary depending on reaction conditions, the position of sampling points on a continuous or semi-continuous polymerization system, or the specific point in a reaction process a sample is taken in a batch polymerization reaction. The molecular weight of the oligomers can be, for example, 8,000 to 10,000 in small-scale reactions, 3,000 to 8,500 on a medium scale extruder, or about 12,000 on a large-scale extruder, as determined by GPC using polystyrene standards.

Ester-linked terminal groups, as well as the types and content of terminal and incorporated monomer units present, can be detected by spectroscopic techniques. Spectroscopic methods for the analysis of terminal groups and incorporated monomer units include vibrational spectroscopy such as infrared or Raman spectroscopy and nuclear magnetic resonance (NMR) spectroscopy. Such methods and their application to the qualitative and quantitative analysis of oligomers and polymers are described in more detail in Spectroscopy of Polymers by J. Koenig (ISBN 0-8412-1904-4) and Modern Polymer Spectroscopy by G. Zerbi (ISBN 3527296557), both of which are hereby incorporated by reference.

Of these methods, NMR spectroscopy is the preferred one because it allows an unambiguous structural assignment. It will be understood by one skilled in the art that the NMR resonances in an NMR spectrum can be assigned to specific structural features of an oligomer or polymer by using one or more methods including: comparison of the observed chemical shifts with those observed for analogous low-molecular weight model compounds, calculation of chemical shifts by using derived additivity relationships (particularly for $^{13}C$ NMR), synthesis of oligomers or polymers with known specific structural or compositional features to establish the particular resonance-structure relationships, synthesis of oligomers or polymers with selectively enriched $^{13}C$ sites or having deuterium selectively substituted for protons, comparison of the intensities of structural sequences with those intensities predicted based on models of the polymerization kinetics and statistical distributions, various 1-dimensional (1-D) spectral-editing methods such as the selective-spin-decoupling used for the determination of the proton bonding of carbon atoms, and various two-dimensional (2-D) techniques for determining the coupling between nuclei and to reveal the chemical shifts of the nuclei, and derivatization reactions of specific functional groups prior to NMR analysis. The chemical bonding between the various constituent atoms can often be inferred from the $^1H$ and $^{13}C$ chemical shifts and from the spin-spin coupling between nuclei. One skilled in the art will understand that each of these techniques has its limitations and that it is often necessary to use a combination of these techniques, as well as other physical and chemical methods as needed.

If the oligomer or polymer is soluble, high-resolution solution NMR spectra can generally be obtained. Because high solution viscosities can shorten relaxation times and thus broaden line widths, one skilled in the art will understand that various standard methods can be applied to obtain high-resolution NMR spectra, for example, a solution can be diluted or the measurement temperature increased, or a higher magnetic field strength can be applied.

One skilled in the art will appreciate that the choice of solvent is important. Preferred solvents are magnetically isotropic and inert, and therefore do not interact strongly with the oligomer or polymer (e.g., no hydrogen-bonding interactions between the solvent and the oligomer or polymer and no degradation of the oligomer or polymer by the solvent). In addition exemplary solvents do not contain functional groups that blank out regions of the NMR spectrum. Exemplary solvents will include deuterated chloroform ($CDCl_3$), and the deuterated form of tetrachloroethane. The deuterated form of other solvents, such as dimethyl sulfoxide, benzene, pyridine, acetone, and dioxane, can also be used if they do not interact strongly with the polymer or degrade it. In the case of $^{13}C$ NMR spectra, additives such as chromium (III) acetylacetonate (also known as chromium (III) pentanedionate or Cracac) can be used to reduce both the T1-relaxation times and the Nuclear Overhauser Effect (NOE).

If the oligomer or polymer is not soluble, various methods well-known in the art can be applied in order to obtain high resolution, narrow linewidths, and enhanced sensitivity in solid-state NMR polymer spectra. For example, one skilled in the art will appreciate that the techniques of high-power decoupling (DD), magic angle spinning (MAS), and cross-polarization (CP) can be applied. One skilled in the art will appreciate that solution NMR methods can provide improved quantitative analysis compared to other methods.

These and all of the other various aspects in obtaining and interpreting NMR spectra of oligomers and polymers are described in more detail in NMR Spectroscopy of Polymers, Edited by R. N. Ibbett (ISBN 075140005X), NMR Spectra of Polymers and Polymer Additives by A. J. Brandolini and D. D. Hills (ISBN 0824789709), NMR Spectroscopy of Polymers by K. Hatada and T. Kitayama (ISBN 3540402209), and Instrumental Analysis by G. D. Christian and J. E. O'Reilly (ISBN 0-205-08640-3), all of which are hereby incorporated by reference.

In the NMR analysis of terminal group type and content, both $^1H$ NMR and $^{13}C$ NMR can be employed, but $^1H$ NMR can provide greater sensitivity and ease of use for quantitative analysis. When the identity of all of the dihydroxy compound and the composition of the oligomer or polymer are known and all of the dihydroxy compounds contain at least one proton that is distinct and distinguishable in the proton NMR spectrum from those of the other dihydroxy compounds as well as the various terminal groups, one can then use the integrated resonances of the various terminal group and dihydroxy units in the $^1H$ NMR in order to calculate the molar amount of each terminal group type present. One can also calculate the relative amounts of the various units on a mass basis by taking into account the molar masses of the various units. For example, in the case of the bisphenol A polycarbonate homopolymer, one can simply measure the integrated intensity of each terminal group type relative to that of the incorporated bisphenol A unit. Taking into account the molar masses of the terminal group type and the incorporated bisphenol A repeat unit, one can then calculate the content of the terminal group on a mass basis, such as ppm. One skilled in the art will recognize the need for the use of either an internal standard for the quantitative analysis or the use of a chemometric software calibration program. In addition, one skilled in the art will understand that various standard corrections can be applied in this analysis, for example, correcting for any differences in the relative number of protons whose intensities have been integrated for each type of structural unit, to improve accuracy.

When the polymer to be analyzed contains "mer" or monomer repeat units (e.g., from incorporated dihydroxy compounds) that do not have distinguishable protons, or when the polymer composition is not known, $^{13}C$ NMR can be applied. In this case the content of a particular terminal group on a mole percent basis can be determined by measuring the integrated area of the resonance for a particular terminal group type relative to that of the carbon of the carbonate group in the polymer backbone. One skilled in the art will understand that one would measure the amount of the terminal group relative to the sum of the carbonate and incorporated diacid units in the case of polycarbonate-polyester. One skilled in the art will also appreciate that a small correction may need to be made in order to correct for the small difference in number of carbonate and incorporated dihydroxy monomer units in the polycarbonate due to the molar stoichiometry of the monomers and the resulting terminal group effects. In addition, the NMR method will not always readily distinguish between functional groups in the polymer versus those in some residual species. One skilled in the art will understand that in this case, residual analyses can be conducted and then a correction to the NMR data can be made. Alternatively the polymer can be purified, for example, by precipitation, to remove any residual species prior to NMR analysis.

As set forth below and in the claims of this application, the quantity of the ester-linked terminal groups is expressed as 'parts per million' (ppm) on a mass basis relative to the sum of the mass of the incorporated monomer units of the oligomer or polymer. An illustrative example calculation of this quantity is shown using the following formula for the calculation of the concentration of the ester-linked terminal group (—IS-Sal-OH) for an isosorbide polycarbonate homopolymer:

$$\text{—IS-Sal-OH (ppm)} = 10 \times FW_{OH} \times n_{\text{—IS-Sal-OH}} / (FW_{IS} \times n_{IS})$$

in which $FW_{OH}$ is the mass of the OH group (17 g/mol), $FW_{IS}$ is the mass of the isosorbide carbonate repeat unit (172 g/mol), $n_{\text{—IS-Sal-OH}}$ is a number that quantifies the relative molar amount of —IS-Sal-OH terminal group, and $n_{IS}$ is a number that quantifies the relative molar amount of isosorbide carbonate units.

There are several ways of measuring these values, which are discussed in the Examples below.

Thus, in an embodiment the oligomer comprises less than 2,000 ppm, specifically less than 1,500 ppm, more specifically less than 1,000 ppm, or less than 500 ppm by weight of the ester-linked terminal group, as determined by $^1H$ NMR. As used herein, the term "less than" a given value means that the ester-linked terminal group is present in amount from 0 up and including the given value. In another embodiment, the oligomer comprises up to 2,000 ppm, specifically up to 1,500 ppm, more specifically up to 1,000 ppm, or up to 500 ppm by weight of the ester-linked terminal group, as determined by $^1H$ NMR. As used herein, "up to" a given value means that the ester-linked terminal group is present in an amount of more than 0 and up and including the given value.

The aliphatic polycarbonates manufactured from the oligomer can accordingly comprises less than 2,000 ppm, specifically less than 1,500 ppm, more specifically less than 1,000 ppm, or less than 500 ppm by weight of the ester-linked terminal group, as determined by $^1H$ NMR. In another embodiment, aliphatic polycarbonates manufactured from the oligomer can comprise up to 2,000 ppm, specifically up to 1,500 ppm, more specifically up to 1,000 ppm, or up to 500 ppm by weight of an ester-linked terminal group, as determined by $^1$H NMR.

The reactants for the polymerization reaction using an ester-substituted diaryl carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure, and other factors that affect polymerization of the reactants. In an embodiment, the ester-substituted diaryl carbonate is added at a mole ratio at 0.8 to 1.3, specifically 0.9 to 1.1, and all subranges there between, relative to the total moles of aromatic dihydroxy compound and aliphatic multifunctional compound.

The melt polymerization reaction using an ester-substituted diaryl carbonate is conducted by subjecting the above reaction mixture to a series of temperature-pressure-time protocols, based on initial oligomer formation, followed, in later stages, by polymerization of the oligomer. Thus initial stages of the reaction can be termed oligomerization and later stages can be termed polymerization.

In some embodiments, the reaction is conducted by gradually raising the reaction temperature in stages, while gradually lowering the pressure in stages. In one embodiment, the pressure is reduced from 100 kPa at the start of the reaction to 1 Pa, or in another embodiment to 5 Pa, in several steps as the reaction approaches completion. The temperature can be varied in a stepwise fashion beginning at a temperature of the melting temperature of the reaction mixture and subsequently increased to 320° C. In one embodiment, the reaction mixture is heated from room temperature to 150° C. The polymerization reaction is started at a temperature of 150° C. to 220° C., the temperature is then increased to 220° C. to 250° C., and then further increased to 250° C. to 320° C. It is to be understood that these are exemplary conditions, and all subranges therebetween can be used. Selection of the appropriate temperature and pressure protocol is readily determined by one of ordinary skill in the art without undue experimentation using these guidelines. The total reaction time is 30 minutes to 200 minutes; again, all subranges therebetween can be useful, depending on the particular monomers and conditions employed. This stepwise procedure produces polycarbonates with the desired molecular weight, glass transition temperature, and physical properties.

In an embodiment, the formation of the ester-linked terminal group can be controlled by selection of the time and temperature of the oligomerization reaction or the polymerization to minimize formation of the ester-linked terminal group.

The reaction proceeds to build the polycarbonate chain with production of an ester-substituted phenolic byproduct. In an exemplary embodiment, where BMSC is used as the ester-substituted diaryl carbonate, methyl salicylate is produced. Efficient removal of the byproduct can be achieved by different techniques such as reducing the pressure. In an embodiment, the pressure starts relatively high in the beginning of the reaction and is lowered progressively throughout the reaction and temperature is raised throughout the reaction. Experimentation is needed to find the most efficient conditions for particular production equipment. In one embodiment, the reacting is conducted at a maximum temperature of 220° C. to 320° C., specifically 250° C. to 300° C., or more specifically 260° C. to 280° C., for a maximum time of 0.5 to 30 minutes, specifically 0.5 to 20 minutes, more specifically 0.5 to 10 minutes, or even more specifically 0.5 to 5 minutes. Again, the optimum time and temperatures can be readily determined by one of ordinary skill in the art using these guidelines, and will depend on the selected reaction conditions, especially the amount of catalyst used.

The concentration of the ester-linked terminal group can be controlled by removal of ester-substituted phenolic byproduct during the oligomerization or polymerization reaction. For example, where BMSC is used as the ester-substituted diaryl carbonate, the concentration of methyl salicylate is controlled by removing the methyl salicylate during the oligomerization reaction, during the polymerization reaction, or during the oligomerization reaction and during the polymerization reaction. The removing can be performed by a method selected from the group consisting of distillation, scrubbing, vacuum distillation, continuous devolatization, batch devolatilization and the like, and a combination comprising at least one of the foregoing removing methods. Scrubbing and continuous devolatilization can be specifically mentioned.

The progress of the reaction can be monitored by measuring the melt viscosity or the weight average molecular weight of the reaction mixture using techniques known in the art such as GPC. These properties can be measured by taking discreet samples or can be measured on-line. After the desired melt viscosity and/or molecular weight is reached, the final polycarbonate product can be isolated from the reactor in a solid or molten form. One of ordinary skill in the art will understand that the method of making aliphatic homopolycarbonate and aliphatic-aromatic copolycarbonates as described in the preceding sections can be a batch or a continuous process and that the disclosed process can be carried out in a solvent free mode. Reactors can be self-cleaning and should minimize any "hot spots." However, vented extruders similar to those that are commercially available can be used.

In one embodiment, the aliphatic polycarbonates are prepared in an extruder in the presence of one or more catalysts. The reactants for the polymerization reaction can be fed to the extruder in powder or molten form. In one embodiment, the reactants are dry blended prior to addition to the extruder. The extruder can be equipped with pressure reducing devices (e.g., vents), which serve to remove the activated phenol byproduct and thus drive the polymerization reaction toward completion. The molecular weight of the polycarbonate product can be manipulated by controlling, among other factors, the feed rate of the reactants, the type of extruder, the extruder screw design and configuration, the residence time in the extruder, the reaction temperature, and the pressure reducing techniques present on the extruder. The molecular weight of the polycarbonate product can also depend upon the structures of the reactants, such as, activated aromatic carbonate, aliphatic multifunctional compound, dihydroxy aromatic compound, and the catalyst employed. Many different screw designs and extruder configurations are commercially available that use single screws, double screws, vents, back flight and forward flight zones, seals, sidestreams, and sizes. One skilled in the art can have to experiment to find the best designs using known principals of commercial extruder design.

As described above, In a melt transesterification polymerization process for making polycarbonate, the aliphatic multifunctional compounds (s) and optional aromatic dihydroxy compound are condensed with the carbonate source (e.g., BMSC) in the presence of a catalyst comprising (a) an alpha catalyst selected from the group consisting of alkali metal salts and alkaline earth metal salts; and optionally (b) a beta catalyst selected from the group consisting of quaternary ammonium compound and a quaternary phosphonium compounds. In a particularly advantageous embodiment, the aliphatic polycarbonate is prepared using only an alpha catalyst (and not a beta catalyst), and the ester-linked terminal group derived from the ester-substituted diaryl carbonate is present in an amount of less than or equal to 500 ppm, specifically less than or equal to 400 ppm, more specifically less than or equal to 300 ppm, and still more specifically less than or equal to 200 ppm, based on the weight of the polycarbonate, and as determined by $^1$H NMR.

Sodium hydroxide can be specifically mentioned as a useful alpha catalyst that functions well without use of a beta catalyst. Isosorbide polymers prepared using sodium hydroxide as the alpha catalyst have an Mw of greater than or equal to 25,000 g/mol, specifically greater than 40,000 g/mol, more specifically greater than 55,000 g/mol, up to 100,000 g/mol, determined as discussed above by GPC relative to polystyrene standards as described in the Examples below.

As discussed above, limiting formation of chain-stopping groups, including ester linked terminal groups, in particular during the formation of oligomers, aids in the manufacture of polycarbonate with high molecular weight. It has been discovered that minimizing the amount of basic catalyst, specifically limiting the amount of basic catalyst during oligomerization and limiting the amount of basic catalyst during polymerization, limits formation of chain-stopping terminal groups including the ester-linked terminal group. In addition it has been discovered that splitting the addition of catalyst in to at least two additions, one during oligomerization and one during polymerization, further limits the presence of excess catalyst and the formation of the above-mentioned chain-stopping groups. In addition, it has been discovered that use of less basic catalysts aids in limiting the formation of the above mentioned chain-stopping terminal groups. Less basic catalysts include polyacids, specifically polyacids partially neutralized by alkali hydroxides. Exemplary polyacids partially neutralized by alkali hydroxides include $Na_2HPO_4$, $NaH_2PO_4$, $NaH_2PO_3$, $Na_2HPO_3$, $NaHSO_4$, $Na_2SO_4$, or a combination comprising at least one of the foregoing polyacids.

Sodium can be present as in impurity in any of the reactants used to form the aliphatic polycarbonates (for example the ester-substituted diaryl carbonate, multifunctional compound of formula (2), aromatic dihydroxy compound, dicarboxylic acid monomers, and the like), and thus can result from a source other than the alpha or beta catalyst. Surprisingly, it has been observed that aliphatic multifunctional compound monomers such as aliphatic diol monomers, in particular isosorbide, can contain significant amounts of alkali metal impurity, in particular sodium as an impurity. In an embodiment the multifunctional compound, in particular the aliphatic diol, can contain less than or equal to 2000 parts per billion (ppb), less than or equal to 1500 ppb, less than or equal to 1000 ppb, less than or equal to 500 ppb, or even less than or equal to less than 100 ppb of an alkali metal impurity. In an exemplary embodiment, the aliphatic diol is isosorbide or a C36 diol, and contains less than or equal to 2000 ppb, less than 1500 ppb, less than 1000 ppb, less than 500 ppb, or less than 100 ppb sodium as an impurity.

It has also been observed that minimizing the amount of basic catalyst, such as sodium hydroxide, reduces the formation of chain-stopping terminal groups such as an ester-linked terminal group. In one embodiment, the basic catalyst, e.g., sodium hydroxide, is present in an amount of less than or equal to 250 micromoles, less than 200 micromoles, less than 100 micromoles, or less than 50 micromoles per equivalent of the ester-substituted diaryl carbonate. The optimal amount of basic catalysts can at least partly depend on reaction conditions. For example, the presence of aliphatic dicarboxylic acid monomer, continuous (versus batch) operation, and shorter residence times and/or lower reaction temperatures generally require more catalyst.

It has further surprisingly been observed that addition of an acid to the reaction mixture can also decrease or minimize the formation of an ester-linked terminal group, thus enabling manufacture of polycarbonates with high molecular weight. While not wanting to be bound by theory, it is believed that an acid can react with alkali metal impurity in the monomer, such as sodium impurity in the isosorbide, to form an insoluble salt, effectively reducing the available content of alkali metal in the reaction mixture. Thus it is believed that excessive alkali metal catalyst can result in the formation of chain-stopping terminal groups and quenching of alkali metal, including sodium, can aid in reducing the formation of chain-stopping terminal groups. The acid can be added to one or more of the monomers or other reactants (e.g., the ester-substituted diaryl carbonate and/or the first multifunctional compound) prior to oligomerization, during the melt reacting to form an oligomer, during the melt polymerizing, or a combination comprising at least one of the foregoing. It is generally added earlier, i.e., to one or more of the reactants or during their reaction to form oligomer.

The acid can be an organic acid or an inorganic acid. Exemplary organic acids include carboxylic acids, sulfonic acids, or a combination comprising at least one of the foregoing organic acids. Exemplary inorganic acids include hydrochloric acid, nitric acid, phosphoric acid, sulfuric acid, boric acid, hydrofluoric acid, or a combination comprising at least one of the foregoing inorganic acids. In an exemplary embodiment, the acid is sulphuric acid. The acid can be added in an amount sufficient to quench all or a portion of the alkali metal impurity in the monomer. The inorganic acid is added in an amount sufficient to minimize the formation of the ester-linked terminal group, and can be, for example, 1000 to 50 micromoles (μmol) of acid added to the reaction mixture per mole of ester-substituted diaryl carbonate, specifically 500 to 100 μmol of acid added to the reaction mixture per mole of ester-substituted diaryl carbonate. In another embodiment, 1000 to 50 μmol, specifically 500 to 100 μmol of acid is added to the reaction mixture per mole of multifunctional compound. In another embodiment, 1000 to 50, specifically 500 to 100 μmol of acid is added to the reaction mixture per mole of aliphatic multifunctional compound, in particular aliphatic diol.

In addition to the aliphatic polycarbonates described above, thermoplastic compositions comprising combinations of the aliphatic polycarbonate with other thermoplastic polymers can be prepared using, for example homopolycarbonates, other polycarbonate copolymers (i.e., copolycarbonates) comprising different $R^1$ moieties in the carbonate units of formula (1), for example polysiloxane-polycarbonates, polyester-polycarbonates, and polyesters. These combinations can comprise 1 to 99 wt %, specifically 10 to 90, more specifically 20 to 80 wt % of the aliphatic polycarbonate, with the remainder of the compositions being other of the foregoing polymers, and/or additives as described below.

In addition to the aliphatic polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed for a time during the mixing of the components for forming the composition. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives having the same or different function can be used, for example a combination of two light stabilizers, or a combination of a heat stabilizer, mold release agent, and ultraviolet light stabilizer. In general, the additives are used in the amounts generally known to be effective. The total amount of additives (excluding any impact modifier, filler, and reinforcing additives) is 0.01 to 5 parts by weight, based on 100 parts by weight of the total composition.

Exemplary impact modifiers include high molecular weight elastomeric materials. The elastomeric materials can be in the form of homopolymers or copolymers, including random, block, radial block, graft, and core-shell copolymers. Combinations of impact modifiers can be used. Exemplary impact modifiers are a natural rubber, low-density polyethylene, high-density polyethylene, polypropylene, polystyrene, polybutadiene, styrene-butadiene, styrene-butadiene-styrene, styrene-ethylene-butadiene-styrene, acrylonitrile-butadiene-styrene, acrylonitrile-ethylene-propylene-diene-styrene, styrene-isoprene-styrene, methyl methacrylate-butadiene-styrene, styrene-acrylonitrile, ethylene-propylene copolymer, an ethylene-propylene-diene terpolymer, ethylene-methyl acrylate copolymer, ethylene-ethyl acrylate copolymer, ethylene-vinyl acetate copolymer, ethylene-glycidyl methacrylate copolymer, polyethylene terephthalate-poly(tetramethyleneoxide)glycol block copolymer, polyethylene terephthalate/isophthalate-poly(tetramethyleneoxide) glycol block copolymer, and silicone rubber. When used, impact modifiers are present in amounts of up to 30 parts by weight, specifically 1 to 30 parts by weight, based on 100 parts by weight of the total composition, excluding any filler.

Possible fillers and reinforcing agents include, for example, mica, clay, feldspar, quartz, perlite, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous or chopped carbon or glass fibers, barium titanate, $TiO_2$, aluminum oxide, magnesium oxide, particulate, flaked, or fibrous aluminum, copper, or nickel, glass flakes, flaked silicon carbide, natural fillers such as wood flour, fibrous cellulose, cotton, sisal, jute, starch, lignin, ground nut shells, or rice grain husks, and reinforcing organic fibrous fillers such as poly(ether ketone), polyimide, polyesters, polyethylene, aromatic polyamides, aromatic polyimides, polyetherimides, polytetrafluoroethylene, and poly(vinyl alcohol). The fillers and reinforcing agents can be coated with a layer of metallic material to facilitate conductivity, or surface treated with silanes to improve adhesion and dispersion with the polymeric matrix resin. When present, fillers are used in amounts of 1 to 200 parts by weight, based on 100 parts by weight of based on 100 parts by weight of the total composition.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, and distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; esters of beta-(5-tert-butyl-4-hydroxy-3-methylphenyl)-propionic acid with monohydric or polyhydric alcohols; esters of distearylthiopropionate, dilaurylthiopropionate, ditridecylthiodipropionate, octadecyl-3-(3,5-di-tert-butyl-4-hydroxyphenyl)propionate, or pentaerythrityl-tetrakis[3-(3, 5-di-tert-butyl-4-hydroxyphenyl)propionate; and amides of beta-(3,5-di-tert-butyl-4-hydroxyphenyl)-propionic acid. Antioxidants are used in amounts of 0.01 to 0.1 parts by weight, based on 100 parts by weight of the total composition, excluding any filler.

Exemplary heat stabilizer additives include organophosphites such as triphenyl phosphite, tris-(2,6-dimethylphenyl) phosphite, and tris-(mixed mono-and di-nonylphenyl)phosphite; and phosphonates such as dimethylbenzene phosphonate; phosphates such as trimethyl phosphate. Heat stabilizers are used in amounts of 0.01 to 0.1 parts by weight, based on 100 parts by weight of the total composition, excluding any filler.

Exemplary light stabilizers and/or ultraviolet light (UV) absorbing additives include benzotriazoles such as 2-(2-hydroxy-5-methylphenyl)benzotriazole, 2-(2-hydroxy-5-tert-octylphenyl)-benzotriazole, and 2-hydroxy-4-n-octoxy benzophenone. Light stabilizers are used in amounts of 0.01 to 5 parts by weight, based on 100 parts by weight of the total composition, excluding any filler.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene) bis(4H-3, 1-benzoxazin-4-one); and 1,3-bis[(2-cyano-3,3-diphenylacryloyl)oxy]-2,2-bis[[(2-cyano-3,3-diphenylacryloyl)oxy]methyl]propane. UV absorbers are used in amounts of 0.01 to 5 parts by weight, based on 100 parts by weight of the total composition, excluding any filler.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; fatty acid esters such as alkyl stearyl esters, e.g., methyl stearate, stearyl stearate, pentaerythritol tetrastearate, and the like; and waxes such as beeswax, montan wax, and paraffin wax. Such materials are used in amounts of 0.1 to 1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds. The thermoplastic composition can be essentially free of chlorine and bromine, i.e., have a bromine and/or chlorine content of less than or equal to 100 parts per million by weight (ppm), less than or equal to 75 ppm, or less than or equal to 50 ppm, based on the total parts by weight of the composition, excluding any filler.

Exemplary flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, bis(2-ethylhexyl) phenyl phosphate, tri(nonylphenyl) phosphate, bis(dodecyl) p-tolyl phosphate, dibutyl phenyl phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Exemplary flame retardants containing phosphorus-nitrogen bonds include phosphonitrilic chloride, phosphorus ester amides, phosphoric acid amides, phosphonic acid amides, phosphinic acid amides, and tris (aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler.

Exemplary halogenated materials that can be used as flame retardants include bisphenols such as bis(2,6-dibromophenyl)-methane; 2,6-bis-(4,6-dichloronaphthyl)-propane; 2,2-bis-(3,5-dichloro-4-hydroxyphenyl)-propane; and 2,2 bis-(3-bromo-4-hydroxyphenyl)-propane. Other exemplary halogenated materials include 1,3-dichlorobenzene, 1,4-dibromobenzene, 1,3-dichloro-4-hydroxybenzene; biphenyls such as 2,2'-dichlorobiphenyl, polybrominated 1,4-diphenoxybenzene, 2,4'-dibromobiphenyl, 2,4'-dichlorobiphenyl, and decabromodiphenyl oxide; and oligomeric and polymeric halogenated aromatic compounds, such as a copolycarbonate of bisphenol A and tetrabromobisphenol A and a carbonate precursor, e.g., phosgene. Metal synergists, e.g., antimony trioxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$; and fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are used in amounts of 0.01 to 10 parts by weight, more specifically 0.02 to 1 parts by weight, based on 100 parts by weight of the total composition, excluding any filler.

Anti-drip agents can also be used in the composition, for example fibril forming or non-fibril forming fluoropolymers such as polytetrafluoroethylene (PTFE). The anti-drip agent can be encapsulated by a rigid copolymer, for example styrene-acrylonitrile (SAN). Antidrip agents can be used in amounts of 0.1 to 10 parts by weight, based on 100 parts by weight of the total composition, excluding any filler.

Thermoplastic compositions comprising the aliphatic polycarbonate can be manufactured by various methods. For example, powdered aliphatic polycarbonate, other polymer (if present), and/or other optional components are first blended, optionally with fillers in a HENSCHEL-Mixer® high speed mixer. Other low shear processes, including hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder can be operated at a temperature higher than at which the composition will flow. The extrudate is immediately quenched in a water batch and pelletized. The pellets, so prepared, when cutting the extrudate can be one-fourth inch long or less as desired. Such pellets can be used for subsequent molding, shaping, or forming.

The aliphatic polycarbonate can have an Mw of greater than 1,000 to less than or equal to 100,000 g/mol. In a particularly advantageous embodiment, the disclosed process can be used to prepare aliphatic polycarbonates (including aliphatic-aromatic copolycarbonates and aliphatic polycarbonate-polyesters) having an Mw of 25,000 g/mol or greater, 40,000 g/mol or greater, or 55,000 g/mol or greater. The aliphatic polycarbonates can have a number averaged molecular weight (Mn) of greater than or equal to 15,000 g/mol, specifically greater than or equal to 18,000 g/mol, more specifically greater than or equal to 19,000 g/mol, and still more specifically greater than 25,000 g/mol, up to 80,000 g/mol. The polydispersity (Mw/Mn) for the aliphatic polycarbonate is less than or equal to 3, specifically less than or equal to 2.5, more specifically less than or equal to 2.2, and still more specifically less than or equal to 2.1. The polycarbonate can have a polydispersity of 2 to 3. Molecular weight (Mw and Mn) and polydispersity are determined using GPC as described in the Examples below, relative to polystyrene standards.

The aliphatic polycarbonates can have a melt volume ratio (MVR) of 0.5 to 80, more specifically 2 to 40 $cm^3$/10 minutes, measured at 250° C. under a load of 5 kg according to ASTM D1238-04.

In one embodiment the glass transition temperature of the aliphatic polycarbonates can be greater than or equal to 90° C. and less than 130° C. In another embodiment the glass transition temperature of the aliphatic polycarbonates can be greater than or equal to 100° C. and less than 125° C.

The aliphatic polycarbonates can further be manufactured to be substantially transparent. In this case, the aliphatic polycarbonate can have a transparency of greater than or equal to 55%, specifically greater than or equal to 60%, more specifically greater than or equal to 70%, still more specifically greater than or equal to 80%, and still more specifically greater than or equal to 90%, as measured using 3.2 mm plaques according to ASTM D1003-00. Alternatively, or in addition, the aliphatic polycarbonates can have a haze of less than or equal to 15%, specifically less than or equal to 10%, and still more specifically less than or equal to 5%, as measured using 3.2 mm thick plaques according to ASTM D1003-00.

The aliphatic polycarbonates can further exhibit a lower refractive index (RI), higher scratch resistance, and lower oxygen permeability compared to bisphenol A homopolycarbonates. Furthermore, the aliphatic polycarbonates are also optically active when prepared using enantiomerically pure or enantiomerically enriched aliphatic diol (e.g., D-(+)-isosorbide, and the like).

The aliphatic polycarbonates can be used in making various articles, including a film, a sheet, an optical wave guide, a display device, and a light emitting diode prism. Furthermore the polycarbonates can further be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Exemplary articles include automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

The methods and polycarbonates are further illustrated by the following non-limiting examples.

EXAMPLES

The polycarbonates described in the following examples were prepared from the components described in Table 1.

TABLE 1

| Component | Supplier |
|---|---|
| Isosorbide, containing less than 1 ppm sodium | Cargill |
| Isosorbide, containing approx. 15-20 ppm sodium | Roquette |
| Bisphenol A | SABIC Innovative Plastics |
| C36 fatty dimer diol, PRIPOL 2033 (CAS # 147853-32-5) | Uniqema |
| BMSC (bis(methylsalicyl) carbonate) | SABIC Innovative Plastics |
| Sodium hydroxide | Sigma Aldrich |
| C36 hydrogenated fatty dimer dicarboxylic acid, PRIPOL1009 (CAS# 68783-41-5) | Uniqema |

Gel permeation chromatography (GPC) was used to determine the Mw, Mn, and polydispersity of the aliphatic polycarbonates, using a crosslinked styrene-divinylbenzene mixed-bed column. The column temperature was maintained at 25° C. The column was eluted with chloroform as eluent, at a flow rate of 1.00 ml per minute. A refractive index detector was used. The sample solution was prepared by dissolving the 20 milligrams (mg) of the isosorbide polycarbonate in 10 ml of dichloromethane. 10 microliters (μl) of the sample solution was injected in the column and the sample was eluted over a total run time of less than 2 hours. A calibration curve (i.e., a universal calibration curve) was constructed using polystyrene or polycarbonate standards with narrow polydispersity. Molecular weights are expressed as molecular weights against polystyrene or polycarbonate, as indicated. Analysis of a standard against both polystyrene and polycarbonate provided an approximate relationship between molecular weights determined using polystyrene and polycarbonate standards. Thus molecular weights based on polycarbonate standards can be estimated using data based on polystyrene standards (and polystyrene molecular weights based on data using polycarbonate data) using the following formula:

$$Mw(PC)=(0.427 \times Mw(PS))+4263$$

Nuclear magnetic resonance spectroscopy (NMR) was used to characterize chemical structure, in particular to identify and quantify the concentration of salicylate terminal groups. Isosorbide, C36 diol, and bisphenol A polycarbonates were evaluated by $^1$H and $^{31}$P NMR (at 400 MHz and 162 MHz, respectively).

$^{31}$P NMR was performed after derivatization of the free hydroxyls on the terminal polymer groups with a reactive phosphorous labeling agent. The $^{31}$P NMR samples were prepared by dissolving 40 mg mesitol (2,4,6-trimethylphenol, internal standard) and 225 mg of sample in 4 mL of chloroform, derivatized by adding 4 drops 1,2-phenylenephosphorochloridite (also referred to as 2-chloro-1,2,3-benzodioxophosphole, abbreviated PPC), and diluting the resulting solution to 100 mL with chloroform. An exemplary $^{31}$P NMR spectrum is shown in FIG. 1.

Spectral analysis and quantitation of the total -salicyl-OH (-Sal-OH) terminal groups (which can include —IS-Sal-OH and -BPA-Sal-OH terminal groups) in a terpolymer comprising units derived from isosorbide, bisphenol A, and a C36 diacid ("IS/BPA/C36 diacid copolymer") using $^1$H NMR was carried out as follows. $^1$H NMR spectra were recorded on a Bruker Avance Ultrashielded 400 MHz (1H-Frequency) system equipped with a 5 mm QNP Probehead. The following settings were used:

Acquisition time: 2.56 secs
Number of scans: 256
Recycle delay: 10 secs
Experiment: 30 degr. 1H-pulswidth
Temperature: 44° C.

Samples were analyzed in deuterated chloroform (50 to 70 mg polymer in 1.0 ml CDCl$_3$) containing 0.1% w tetramethylsilane (TMS) as reference. The spectra were obtained by Fourier transformation of the FID after application of 0.3 Hz apodization and phase correction. The chemical shift of the TMS protons is set at 0.0 ppm. A spectrum of the $^1$H NMR solvent was recorded to determine the ratio of undeuterated chloroform (d=7.25 ppm) to TMS.

The quantity of -Sal-OH terminal groups is expressed as 'parts per million' (ppm) relative to the terpolymer using the following formula:

$$\text{-Sal-OH (ppm)} = 10^6 \times FW_{OH} \times n_{\text{-Sal-OH}}/(FW_{BPA} \times n_{BPA} + FW_{IS} \times n_{IS} + FW_{C36} \times n_{C36})$$

in which $FW_{OH}$ is the mass of the OH group (17 g/mol),
$FW_{BPA}$ is the mass of the BPA-carbonate repeat group (254 g/mol),
$FW_{IS}$ is the mass of the isosorbide carbonate repeat unit (172 g/mol),
$FW_{C36}$ is the mass of the C36 PRIPOL 1009 fatty acid dimer ester repeat unit (592 g/mol),
$n_{\text{-Sal-OH}}$ a number that quantifies the relative molar amount of terminal salicyl carbonate groups,
$n_{BPA}$ is a number that quantifies the relative molar amount of bisphenol A carbonate units,
$n_{IS}$ is a number that quantifies the relative molar amount of isosorbide carbonate units, and
$n_{C36}$ is a numbers that quantifies the relative molar amount of dicarboxylic ester unit.

These numbers should be expressed on the same scale/in the same unit and can be derived from the $^1$H NMR spectrum as follows.

The quantity $n_{IS}$ is given by the taking one third of the integral between 4.56 and 5.26 ppm (corresponding to 3 protons of IS-carbonate) and adding the integral between 3.48 and 3.62 ppm (corresponding to 1 proton of IS—OH). The term $n_{IS}$ is assumed to represent the sum of all isosorbide units, whether they have reacted once, twice, or not at all.

The quantity $n_{BPA}$ is calculated using the following formula:

$$n_{BPA} = (\text{Integral}_A - n_{chloroform} - 2 \times n_{tMSc} - 2 \times n_{iSC} - 2 \times n_{Sal\text{-}OH} - n_{MS})/8$$

wherein

Integral$_A$ is the signal of the aromatic bisphenol A protons between 6.90 and 7.36 ppm, which is corrected for overlapping peaks and divided by 8 to correct for the amount of protons/BPA unit (the overlapping signals are from chloroform (which is quantified relative to TMS using the ratio from the blank spectrum of the solvent)
terminal methyl salicyl carbonate ($n_{tMSc}$), is quantified by its signal at 7.93 to 8.09 ppm,
internal salicyl carbonate ($n_{iSc}$) is quantified by its signal between 8.12 and 8.23 ppm, -Sal-OH terminal groups ($n_{Sal\text{-}OH}$) are quantified by the signal between 10.43 and 10.49 ppm, and
methyl salicylate ($n_{MS}$) is quantified by its signal between 10.62 and 10.73 ppm.

The quantity $n_{C36}$ is calculated using the formula below:

$$n_{C36} = (\text{Integral}_B + \text{Integral}_C - 6 \times n_{BPA})/68$$

in which

Integral$_B$ is the integral between 2.16 and 2.68 ppm, and
Integral$_C$ is the integral between 0.33 and 2.00 ppm.

The sum of these integrals is believed to contain all of the protons in the C36 dicarboxyl acid as well as the 6-proton signal from the bisphenol A methyl groups. This contribution ($n_{BPA}$, calculation given above) is subtracted from the integral before dividing by 68 to give an equivalent number for the C36 diacid.

The quantity $n_{\text{-Sal-OH}}$ is determined as indicated above by the signal between 10.43 and 10.49 ppm.

Figure 2:
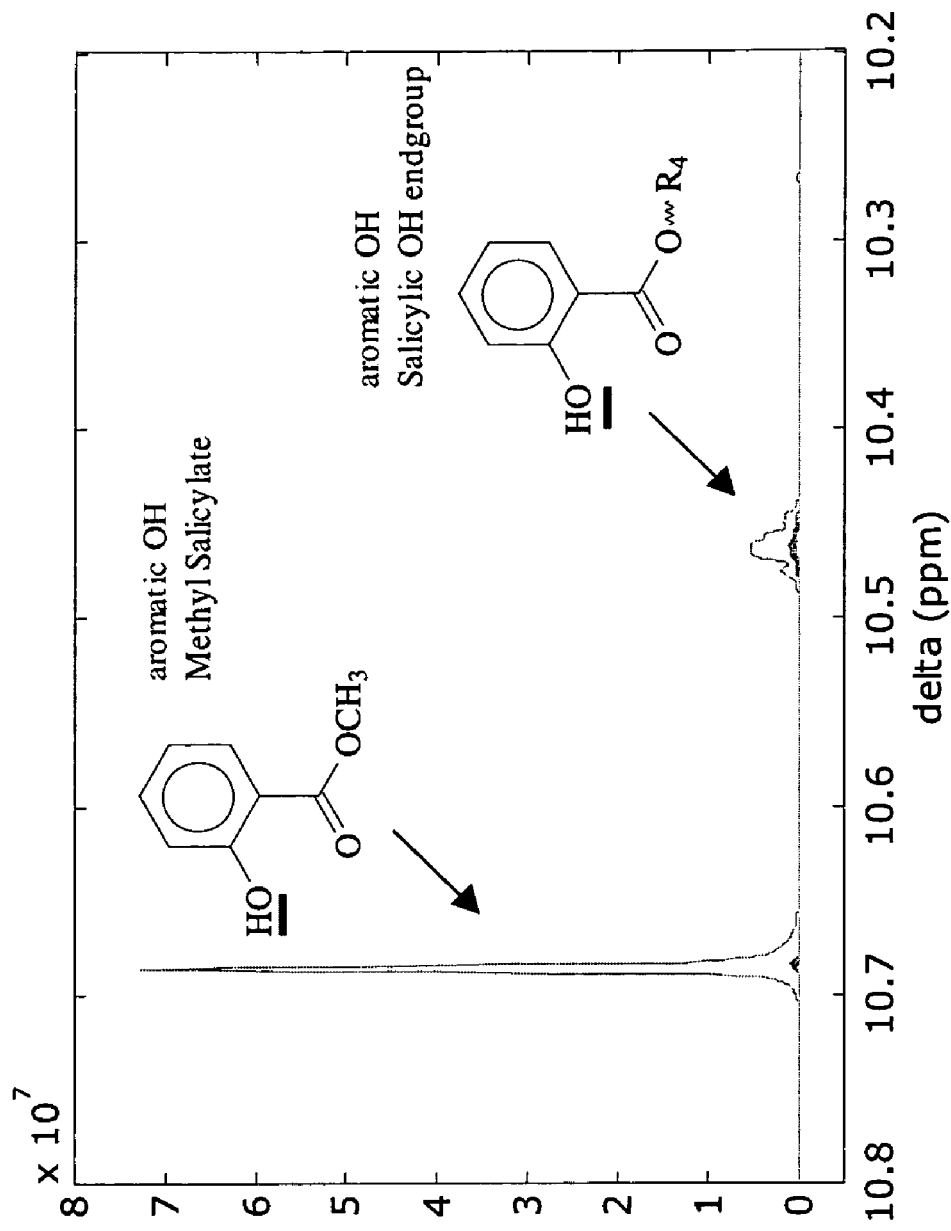
FIG. 2 is a $^1$H NMR spectrum of an aliphatic polycarbonate oligomer.

In those cases where a small peak is superimposed on the slope of a larger one, a baseline correction is applied, eliminating the slope before taking the integral. This is typical for the IS—OH integral between 3.48 and 3.62 ppm and the terminal methyl salicyl carbonate integral between 7.93 and 8.09 ppm. An exemplary $^1$H NMR spectrum is shown in FIG. 2.

Different terminal groups can be distinguished by means of both $^{31}$P NMR and $^1$H NMR as shown in Table 2.

TABLE 2

| Group | $^1$H NMR resonances (delta ppm) | $^{31}$P NMR resonances (delta ppm) |
| --- | --- | --- |
| —IS—OH | not detected | 128.8/128.2 |
| —IS-Sal-OH | 10.47 | 124.8/125.7 |
| Free Isosorbide | not detected | 128.4/126.9 |
| BPA-OH | 6.7/4.3 | 125.4 |
| -BPA-Sal-OH | 10.45 | 125.5 |

From the data in Table 2, it can be seen that terminal isosorbide hydroxyl groups ("—IS—OH"), free isosorbide hydroxyl groups, terminal bisphenol A hydroxyl groups ("-BPA-OH"), and isosorbide salicylic acid ester terminal groups ("—IS-Sal-OH") of formula (29) can be distinguished and determined quantitatively.

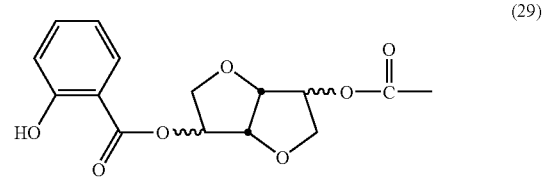

(29)

Example 1

Small Scale Batch Oligomerization and Polymerization

A series of small-scale oligomerization and polymerization reactions were carried out in a glass tube reactor, which was equipped with a vacuum system. Before charging the monomers the glass reactor tube was soaked in 1M HCl for at least 24 hours to remove any sodium present at the surface of the glass. After this acid bath the glass tube was rinsed using 18.2 MW (Milli-Q quality) water for at least 5 times. The batch reactor tube was charged at ambient temperature and pressure with 8.76 grams of solid isosorbide, and 20.00 grams of the solid BMSC thus using a molar ratio of 1.01:1 (BMSC: isosorbide). After this the reactor system was sealed shut, the system was deoxygenated by briefly evacuating the reactor and then introducing nitrogen. This process was repeated three times. 100 µl of the catalyst (0.5 M aqueous sodium hydroxide) was added to the reactor as an aqueous solution at different concentrations that varied from 0 to $400\times10^{-6}$ mol NaOH per mol isosorbide as shown in Table 4. The temperature of the reactor was maintained using a heating mantle with a PID controller. The pressure over the reactor was controlled by a nitrogen bleed into the vacuum pump downstream of the distillate collection flasks and measured with a pressure gauge. The reactor was brought to near atmospheric pressure and reaction time is started at the same moment as the heater is switched on. The reactions were carried out according to the conditions in Table 3. In Table 3, "$T_r$" is the set point temperature of the reactor; and "$T_o$" is the set point temperature of the overhead. The vacuum system removed the methyl salicylate byproduct, which was condensed in condensers. The product was recovered by removing a drain nut at the bottom of each reactor.

TABLE 3

| Time | Remarks |
|---|---|
| 0:00:00 | Set $T_r$ at 170° C.; $T_o$ at 100° C., pressure at 100 kPa |
| 0:06:00 | Set stirrer at approximately 300 rpm |
| 0:15:00 | Set Tr at 230° C. |
| 0:30:00 | Set P at 50 kPa |
| 0:45:00 | Set Tr at 270° C. and P at 0 kPa |
| 0:49:00 | Open reactor to vent |
| 0:54:00 | Stop |

TABLE 4

| Example | NaOH (µmol per mol isosorbide) |
|---|---|
| 1-1 | 0 |
| 1-2 | 5 |
| 1-3 | 10 |
| 1-4 | 20 |
| 1-5 | 40 |
| 1-6 | 50 |
| 1-7 | 70 |
| 1-8 | 100 |
| 1-9 | 200 |
| 1-10 | 400 |

Figure 3:
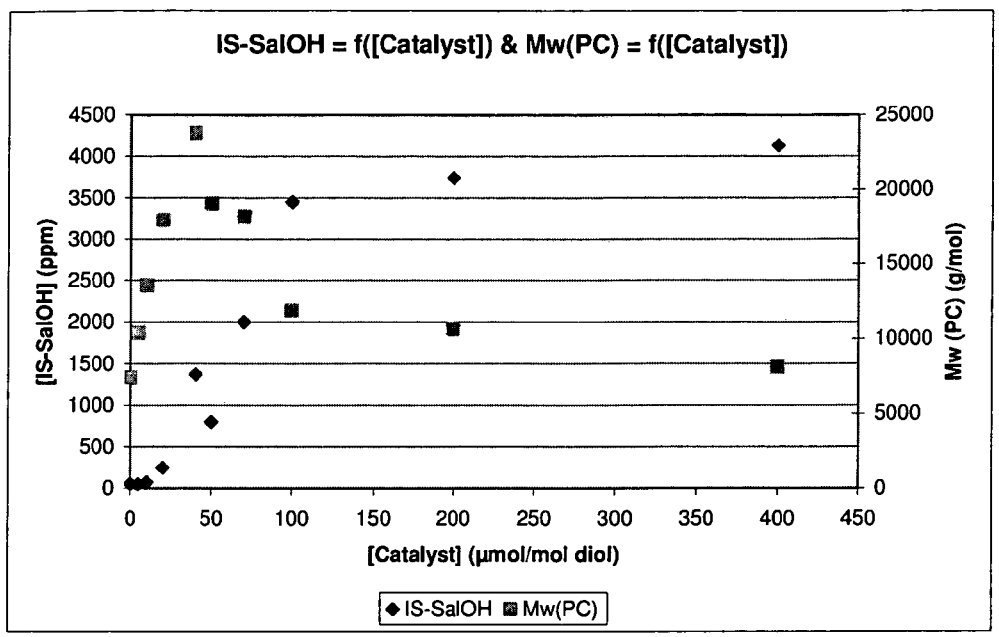
FIG. 3 is a plot of the concentration of the terminal group —IS-Sal-OH and the weight average molecular weight of an aliphatic polycarbonate (determined by GPC, relative to polycarbonate standards) as a function of catalyst (sodium hydroxide) concentration.

The weight average molecular weight of the product polymer was characterized by gel permeation chromatography and is expressed against PC standards. The results are plotted in FIG. 3. FIG. 3 illustrates that the concentration of the basic catalyst has a significant effect on the molecular weight of isosorbide homopolycarbonates. An optimal molecular weight was observed at a use of sodium hydroxide catalyst of 50 µmoles of NaOH per mole of isosorbide.

The concentration of the ester-linked terminal group ("—IS-Sal-OH") in the product polycarbonate was determined for each reaction by 1H NMR. The results are also plotted in FIG. 3. The concentration of the terminal group —IS-Sal-OH was influenced by the amount of sodium hydroxide added to the reaction. The concentration of —IS-Sal-OH was 3500 ppm when 100 µmol of NaOH per mole of isosorbide was used.

Figure 4:
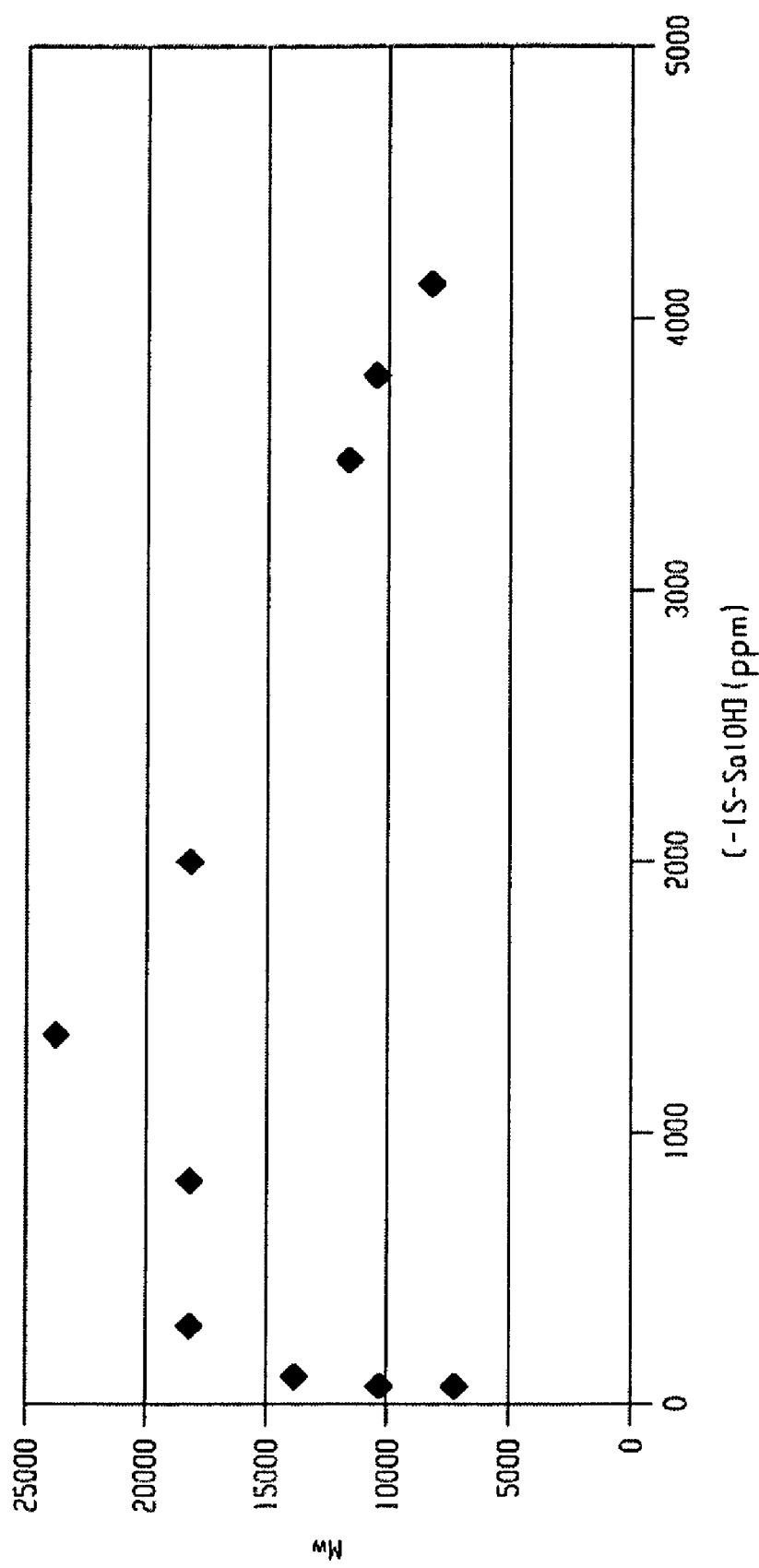
FIG. 4 is a plot of the weight average molecular weight (determined by GPC, relative to polycarbonate standards) of an aliphatic polycarbonate as a function of the concentration of the terminal group —IS-Sal-OH.

FIG. 4 is a plot of the weight average molecular weight of the product polymer as a function of the concentration of the terminal group —IS-Sal-OH. FIG. 4 shows that the molecular weight correlates to the concentration of —IS-Sal-OH.

Example 2

Figure 5:
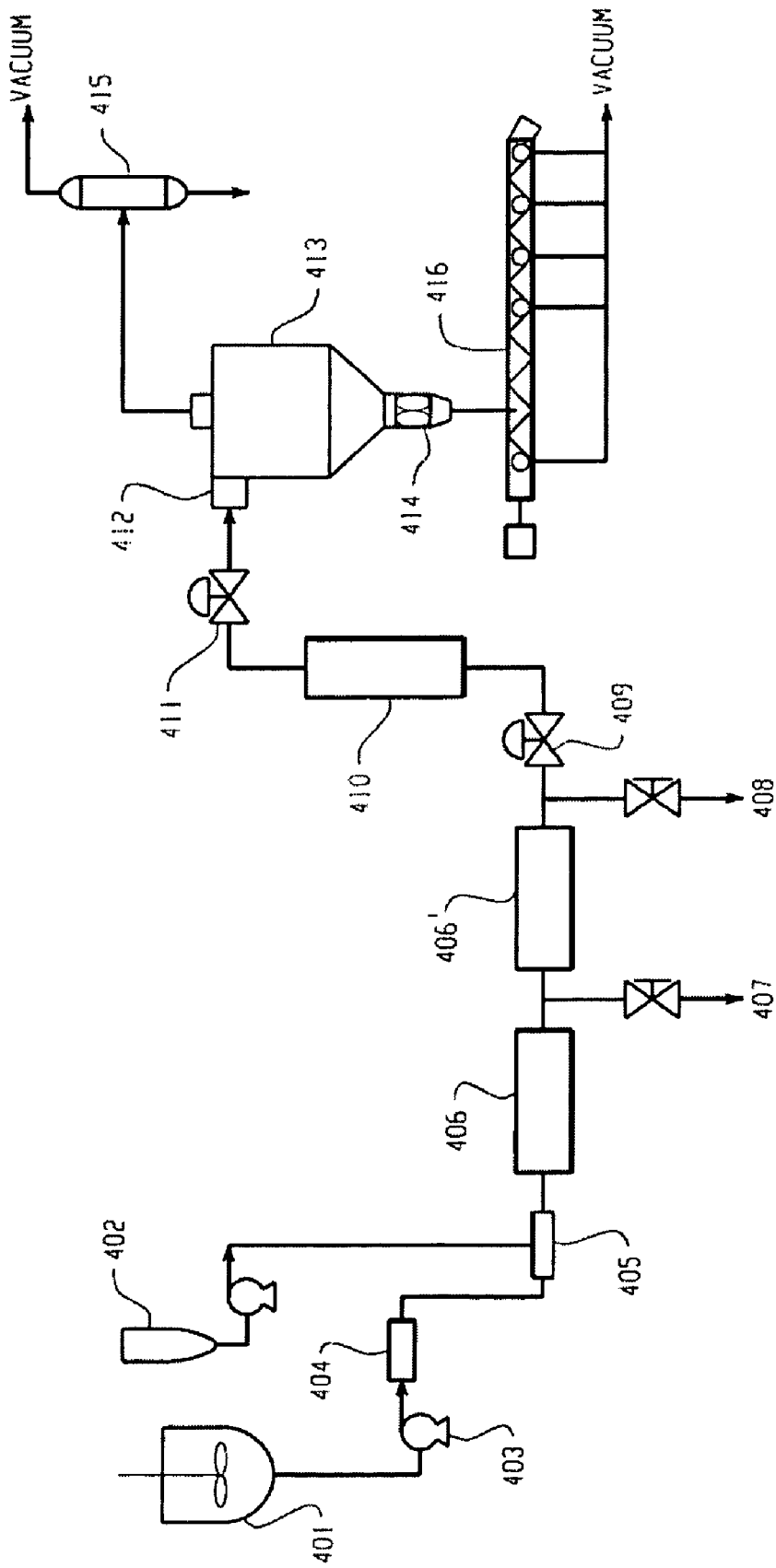
FIG. 5 is schematic diagram of a medium-scale oligomerization and polymerization reactor system.

Medium Scale Oligomerization and Polymerization Using a Plug Flow Reactor-Flash System in Combination with an Extruder A series of medium-scale oligomerization and polymerization reactions were carried out in reactor system shown schematically in FIG. 5. The components of the reactor system are as follows:

401: Formulation vessel
402: HPLC catalyst pump
403: Piston pump
404: Preheater reactor
405: Dosing+SMX mixer section
406, 406': SMXL7-Reactor (2.5 meters each)
407, 408: Drain valves
409: Membrane back pressure valve
410: Devolatilization vessel feed preheater (SMXL7)
411: Membrane back pressure valve
412: Distributor
413: Devolatilization vessel
414: Gear pump and die head
415: Condenser
416: Reactive devolatilizing extruder The operations of reactor systems are as follows.

Formulation Tank:

Monomers are added to a stirred formulation vessel (401). The formulation vessel is then evacuated and purged with nitrogen three times to remove residual oxygen and then adjusted to a slight vacuum of 800 mbar. The vessel is then heated to 150° C. using a heated oil heater in order to obtain a clear solution of monomers (monomer mixture). The clear solution is allowed to cool down to 100° C. and the pressure is adjusted to around atmospheric pressure.

Plug Flow Reactor Section:

The monomer mixture is passed from vessel (401) through hot oil heated feed preheater (404) to ensure a well-defined process temperature at the dosing section (405) and hence at the inlet of plug flow reactor (406, 406'). Positive displacement pump (403) is used in order to enable a steady predefined flow rate of the monomer mixture. An aqueous solution of NaOH and optionally tetramethylammonium hydroxide (TMAH) catalyst solution is added to the dosing section by means of an HPLC pump (402). The dosing section comprises a static mixer to ensure proper mixing of catalyst and the monomer mixture. The plug flow reactor section further contains two drain valves (407, 408) for sampling.

The plug flow reactor consists of two segments of 2.5 meters (406 and 406') of hot oil jacketed Sulzer SMXL static mixers with an internal diameter of 20 mm. The internal volume of the plug flow reactor is 1.66 liter, corresponding to a residence time of 10 minutes at a feed rate of 10 liters/hour.

Downstream of the reactor the oligomer is passed through backpressure control valve (409), which serves to maintain a sufficiently high pressure inside the plug flow reactor to avoid significant evaporation of methyl salicylate. This is a requirement to maintain a single flow regime inside the plug flow reactor that ensures proper functioning of the reactor.

Typically the pressure inside the plug flow reactor is 200 to 500 kPa gauge at temperatures of 170° C. to 230° C.

Flash Devolatilization Section:

From back pressure control valve (409) the oligomer is passed through preheater (410) comprising a hot oil jacketed heat exchanger containing static mixer elements to ensure uniform heating of the oligomer. The preheater is disposed vertically and operated such that the reactants flow in upflow mode. The heat exchanger is operated under vacuum of 20 to 50 kPa absolute under co-current flow using hot oil inlet temperatures range from 230 to 250° C.

After preheating, the mixture is introduced over valve (411) into the distributor (412) inside devolatilization vessel (413). The distributor comprises a horizontal pipe with a perforated plate at the end and is disposed into the side of the flash vessel. Operating temperatures range from 200 to 270° C. Methyl salicylate vapor is removed from the vessel by means of a vacuum unit, and condensed against cooling water in a condenser (415). Typical operating pressures are in the range of 3 to 30 kPa. Polymer formed after removal of the bulk of methyl salicylate is transferred from the vessel to a reactive devolatilizing extruder by means of a gear pump (414) mounted directly to the cone shaped bottom section of the vessel.

Reactive Extrusion Section:

The extruder (416) is a Werner & Pfleiderer ZSK25WLE 25 mm 13-barrel twin-screw extruder (L/D ratio of 59). The extruder is equipped with five forward vacuum vents and one back-vent connected to a single vacuum system. The methyl salicylate byproduct is removed via devolatilization through these vents and condensed against cooling water. Polymer product from the reactive extrusion is passed through a die and cooled in a water bath to yield continuous strands of polymer.

In a typical embodiment of the process described above a clear solution was made of BMSC (112,144 g), isosorbide (38914 g), bisphenol A (9,879 g) and C36 diacid (13,210 g). The monomer mixture was passed through the plug flow reactor operated at a temperature of 200° C. and a pressure of 500 kPa gauge while an aqueous NaOH solution was continuously fed upstream of the plug flow reactor.

The reaction mixture was then passed through the preheater operated at a temperature of 200° C. and a pressure of 20 kPa absolute. After preheating, the mixture was flashed in the system comprising the distributor and the devolatilization vessel at a temperature of 190° C., and a pressure of 5 kPa absolute.

The reaction mixture containing approximately 2 wt % of methyl salicylate was reactively extruded at a screw speed of 300 rpm at a rate of between 8 kg/h and 11 kg/h. The extruder barrels were set to 260° C. and the die was set to 270° C. and the vacuum system was operated at pressures of 0.2 kPa absolute. Polymer product exiting from the die was cooled in a water bath and pelletized.

Samples with 5 different concentrations of sodium hydroxide were collected. Two different aqueous solutions of sodium hydroxide were used: a 0.5 mol % solution was used for the experiments with 175, 200 and 225 micro-equivalents of sodium hydroxide, and a 2.7 mol % solution for those with 600 and 1350 micro-equivalents of sodium hydroxide.

The five samples were analyzed for molecular weight, polydispersity, and concentration of the chain-stopping ester-linked terminal salicylate group. The results are shown in Table 5. The —IS-Sal-OH and -BPA-Sal-OH terminal groups, in sum -Sal-OH, were identified, and quantified by $^1$H NMR as described above.

TABLE 5

| Parameter | Units | 2-1 | 2-2 | 2-3 | 2-4 | 2-5 |
|---|---|---|---|---|---|---|
| Sampling Time | (hour:minute) | 14:04 | 14:53 | 15:13 | 16:28 | 18:02 |
| [NaOH] | micromoles per mole IS | 175 | 200 | 225 | 1350 | 600 |
| Mw (PS)* | g/mol | 52922 | 60347 | 69327 | 17886 | 39132 |
| Mn (PS)* | g/mol | 20222 | 23162 | 28514 | 8278 | 16739 |
| Mw (PC)** | g/mol | 26841 | 29961 | 33736 | 12115 | 21044 |
| d*** | | 2.60 | 2.59 | 2.42 | 2.16 | 2.33 |
| [-Sal-OH] | ppm | 43 | 105 | 310 | 2784 | 1395 |

*Polystyrene standard
**Polycarbonate standard
***Polydispersity

Figure 6:
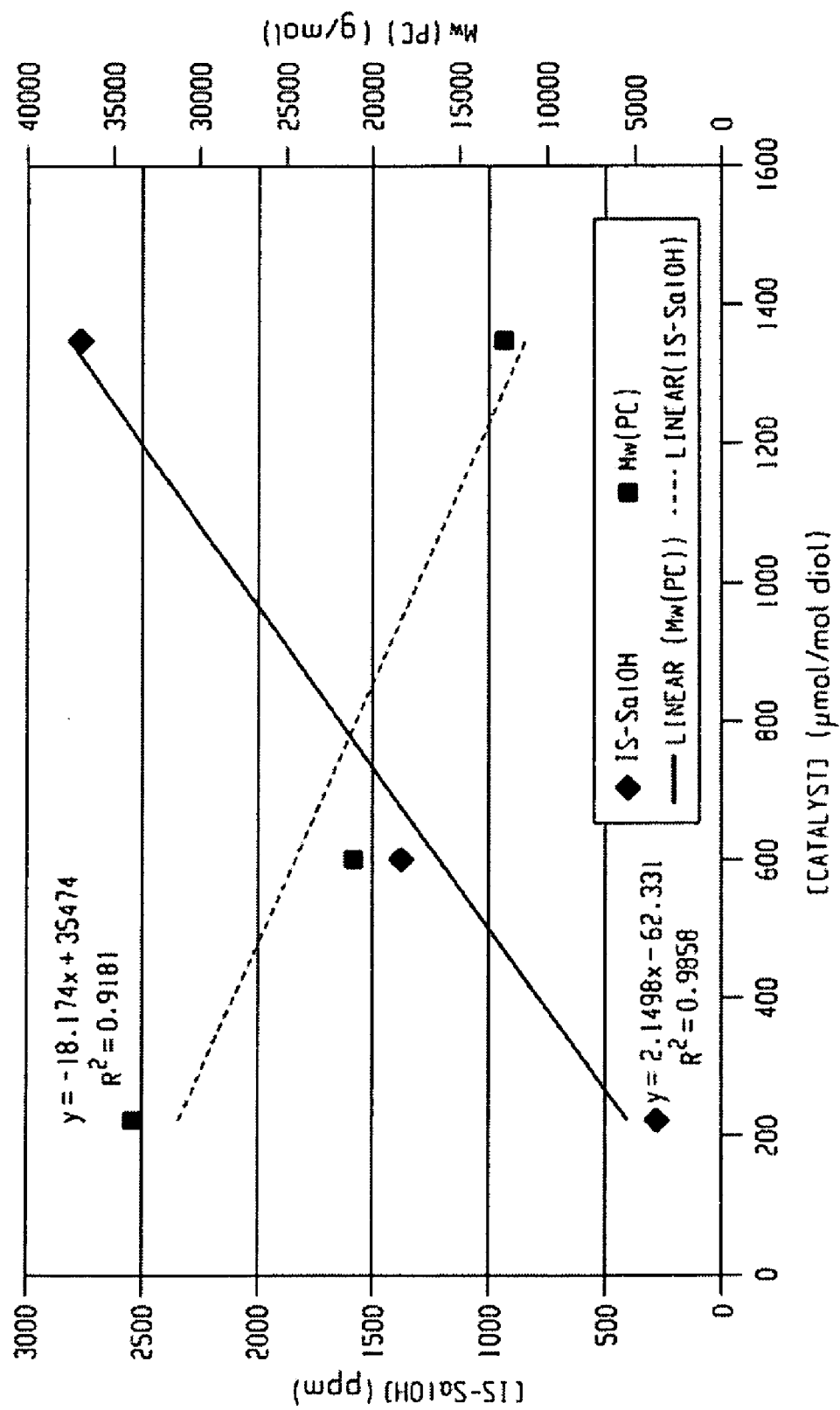
FIG. 6 is a plot of the concentration of the terminal group —Sal-OH and the weight average molecular weight of a polycarbonate (determined by GPC, polycarbonate standards) as a function of sodium catalyst concentration.

The results of Table 5 are plotted in FIG. 6. The data in Table 5 and FIG. 6 illustrate the surprising result that increasing the amount of catalyst results in increasing concentrations of the chain-stopping terminal group -Sal-OH and decreasing molecular weight.

Example 3

Effect of a Beta Catalyst on Molecular Weight

Figure 7:
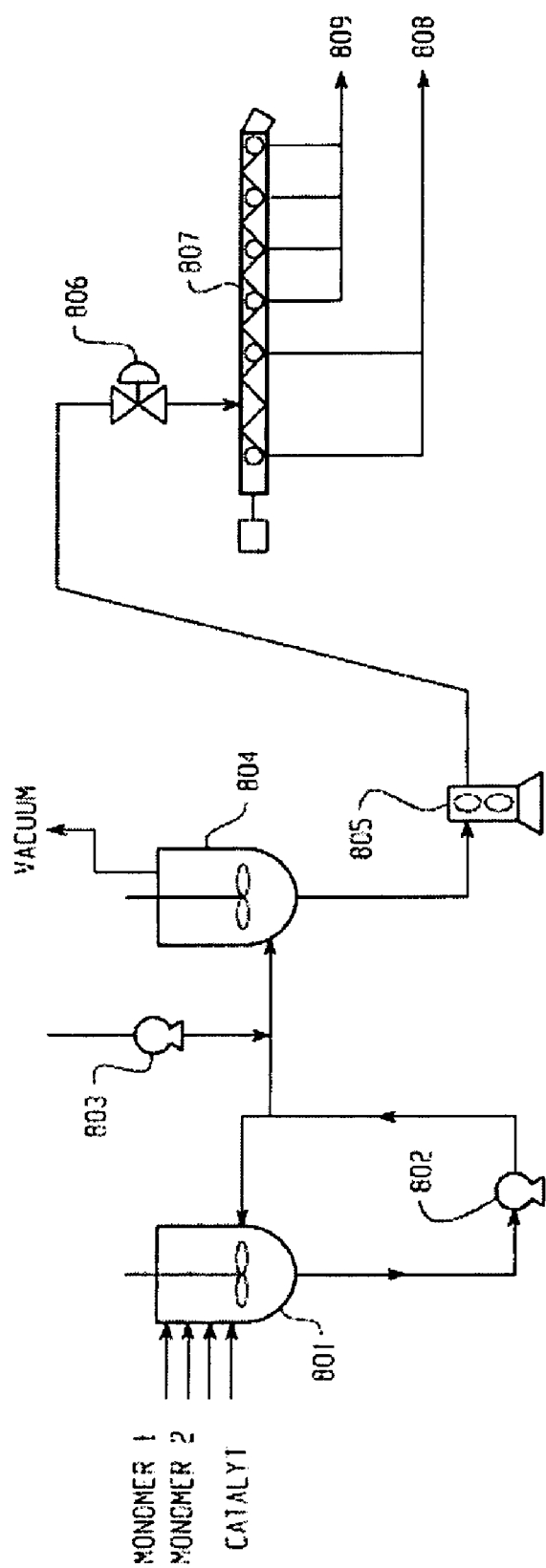
FIG. 7 is a schematic diagram of a reactor system comprising two continuously stirred tank reactors and a reactive extruder in series.

A further series of medium-scale oligomerization and polymerization reactions were carried out in a reactor system shown schematically in FIG. 7. The components of the reactor system are as follows:

801: Oligomerization reactor
802: Devolatilization reactor feed pump
803: Secondary BMSC addition pump
804: Devolatilization reactor
805: Extruder feed pump
806: Flash valve
807: Reactive devolatilizing extruder
808: Lo-vac vacuum system
809: Hi-vac vacuum system Monomers and catalyst are continuously fed into a first CSTR (hereafter also referred to as CSTR-1), oligomerization reactor (801). This reactor is typically operated at atmospheric pressure at temperatures of 150 to 200° C. The reaction mixture is then pumped using pump (802) into a second CSTR (hereafter also referred to as CSTR-2), devolatilization reactor (804). Optionally, additional BMSC is added to the inlet of (804) by means of additional BMSC pump (803). This BMSC is used to fine-tune the molar ratio of monomers and, hence, to control the molecular weight of the polymer product. The flow rate of additional BMSC is not limited but typically amounts to between 0.5% and 10% of the flow rate of BMSC added to (801).

The temperature in (804) is typically higher than in (801), 170° C. to 230° C. The pressure in (804) is typically lower than in (801), 10 kPa absolute to 30 kPa absolute. Hence, methyl salicylate produced as a byproduct during the oligomerization reaction is partially removed from reactor (804) and condensed against cooling water. As a result, the reaction progresses by reaction equilibrium displacement. By means of gear pump (805) the mixture exiting (804) is continuously pumped to extruder (807) where it is reactively extruded.

The feed line to the extruder (807) contains a flash valve (806) in order to maintain a sufficiently high pressure upstream of the valve so as to avoid boiling in the mixture. Extruder (807) is a Werner & Pfleiderer ZSK58 13-barrel twin-screw extruder (L/D ratio of 59). The extruder is equipped with five forward vacuum vents and one back-vent. The backvent and the first forward vent are connected to the lo-vac system (808), the other forward vents are connected to the hi-vac system (809). It is believed that removal of the methyl salicylate by devolatilization and completion of the polymerization reaction occurs in the reactive extruder. The removed methyl salicylate is condensed against cooling water. Polymer product from the reactive extrusion is passed through a die and cooled in a water bath to yield continuous strands of polymer.

In this example BMSC (68.4 kg/h), bisphenol A (6 kg/h), C36 diacid (8.1 kg/h) and isosorbide (23.8 kg/h) with a molar ratio of 13:7:80 (BPA:C36 diacid:isosorbide), were continuously fed into oligomerization reactor (801). An aqueous catalyst solution of sodium hydroxide (6000 ppm, 69 g/h, 50 microequivalents) and an aqueous solution (7.5 w %, 25 g/h, 100 microequivalents) of beta catalyst (tetramethylammonium hydroxide (TMAH)), were continuously added to reactor (801). Reactor (801) was operated at a temperature of 175° C. and at atmospheric pressure. Devolatilization reactor (804) was operating at a temperature of 177° C. and a pressure of 13 kPa absolute. The feed line to extruder (807) was operated at a temperature of 177° C. The reaction mixture was reactively extruded at a screw speed of 125 rpm at a rate of approximately 66 kilograms per hour. The temperature of extruder barrels 7 to 13 was set to 275° C. and the temperature of the die was set to 275° C. The pressure in the lo-vac system (808) was approximately 2.5 kPa and that of the high-vac system (809) was approximately 0.2 kPa.

Nine samples of the polymer collected at the output of the extruder were solidified through a water bath and pelletized.

The concentration of free hydroxyl group was determined by Fourier transform infrared spectroscopy (FTIR). The FTIR samples were prepared by dissolving 0.25 mg of polymer pellet material in 25 ml of chloroform (dry, using 0.5 nm molecular sieve) and this solution was shaken for 10 minutes. A KBr liquid cell (0.5 mm) was used in order to perform the measurements in the FTIR equipment at room temperature.

The —OH group determination was done according to the variation of the signal at 3585 cm$^{-1}$ using calibration standards in order to obtain the —OH monomer proportion in the biopolymer final pellets.

Figure 8:
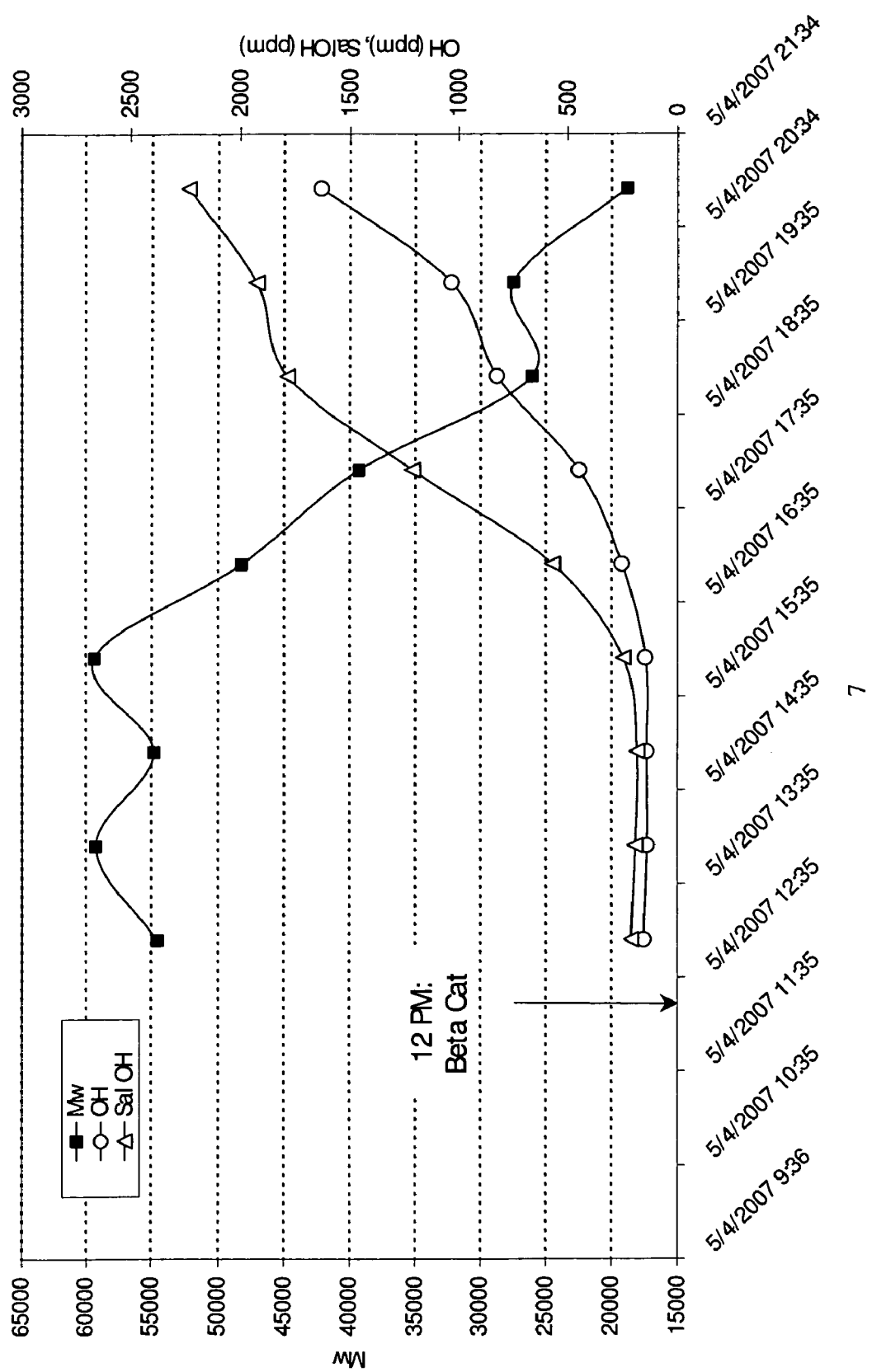
FIG. 8 is a plot of the weight average molecular weight of a polycarbonate (determined by GPC using polystyrene standards), the concentration of terminal hydroxyl group (—OH) and the concentration of an ester-linked terminal group (-Sal-OH) as a function of time during a continuously reactive process.

The calibration of the standard samples was done using $^{31}$P nuclear magnetic resonance spectroscopy (NMR) after derivatization with mesitol as described above. The concentration of -Sal-OH was determined by $^{1}$H NMR, as described above. FIG. 8 is a plot of the weight average molecular weight of a polycarbonate (determined by GPC using polystyrene standards) of the extruded polymer, the concentration of terminal hydroxyl group (—OH), and the concentration of an ester-linked terminal group (-Sal-OH) as a function of time during a continuously reactive process. The reaction is started with alpha catalyst (NaOH) alone. After running the reactors stable for several hours, flow of the beta catalyst TMAH is started at 12:00 PM as indicated by the arrow in FIG. 9.

Initially there is no significant change in Mw for the first 5 hours. Five hours after the addition, the molecular weight of the polymer starts to decrease as the free hydroxyl level and the concentration of -Sal-OH increases. The time lag between the time when the beta catalyst was added and the subsequent decrease in molecular weight and increase in free hydroxyl group and -Sal-OH concentration is consistent with the residence time characteristic of the process comprising the CSTR reactors, the extruder and the interconnecting piping.

Example 4

Effect of -Sal-OH on Maximum Molecular Weight

Figure 9:
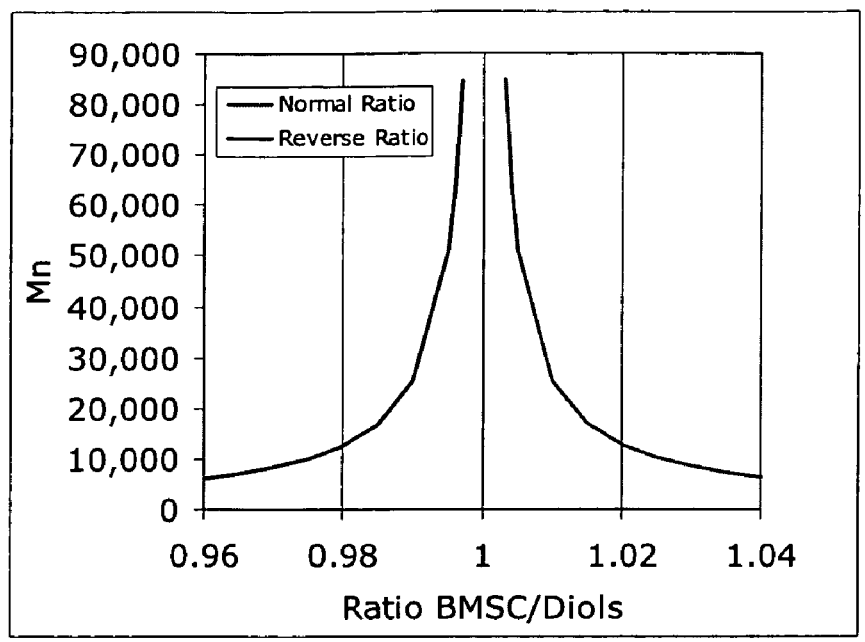
FIG. 9 is a plot of the theoretical relationship between Mn and molar ratio of BMSC to the diols, isosorbide, C36 diacid, and BPA.

The reactor configuration and process conditions described in Example 3 were utilized except that reactor (801) was continuously fed with isosorbide (18.4 kg/h), C36 diacid (7.8 kg/h), bisphenol A (12.4 kg/h) (mole ratios Isosorbide:C36:BPA equals 65:7:28), and BMSC (65 kg/h). An aqueous catalyst solution of 3000 ppm NaOH was continuously fed. No beta catalyst was added. The reaction was run in "normal ratio," where the moles of BMSC were greater than the sum of the moles of isosorbide, C36 diacid, and BPA. In general "normal ratio" refers to the reaction conditions where the number of moles of BMSC are greater than the sum of moles of reacting diols and/or diacids, while reverse ratio refers to the situation wherein the number of moles of BMSC is smaller than the sum of moles of reacting diols and/or diacids. For simplicity in this application sometimes diacids are referred to as diols to reflect the reactive group active in the polymerization. In theory, the highest molecular weight is obtained at a molar ratio of exactly 1. The theoretical molecular weight will then be infinite. FIG. 9 is a plot of the theoretical relationship between Mn and molar ratio of BMSC to the diols, isosorbide, C36 diacid, and BPA. FIG. 9 illustrates that moving from "normal ratio" to "reverse ratio" by a deliberate change in the amount of BMSC the maximum molecular weight of the polymer can be determined.

Four runs were conducted at the temperatures and using the catalyst concentrations indicated in Table 6. The molar ratio of BMSC and the sum of isosorbide, C36 diacid and bisphenol A was changed experimentally by decreasing or increasing the flow rate of BMSC added by secondary BMSC addition pump (803) in the inlet of reactor (804). Following a change of BMSC flow rate final product samples were collected every two minutes in order to monitor the change in molecular weight. The maximum molecular weight as determined by gel-permeation chromatography relative to polystyrene standards achievable at each process condition was determined by averaging the Mw of the three samples at the peak of the curve.

TABLE 6

| Run | Temperature of CSTR-1 (° C.) | [NaOH]* (µeq) |
|---|---|---|
| 5-1 | 175 | 40 |
| 5-2 | 175 | 80 |
| 5-3 | 190 | 60 |
| 5-4 | 190 | 80 |

*Concentration of catalyst expressed as micro-equivalents of catalyst, which is defined as the micromoles of sodium hydroxide divided by the sum of moles of diol and moles of diacid.

Figure 10:
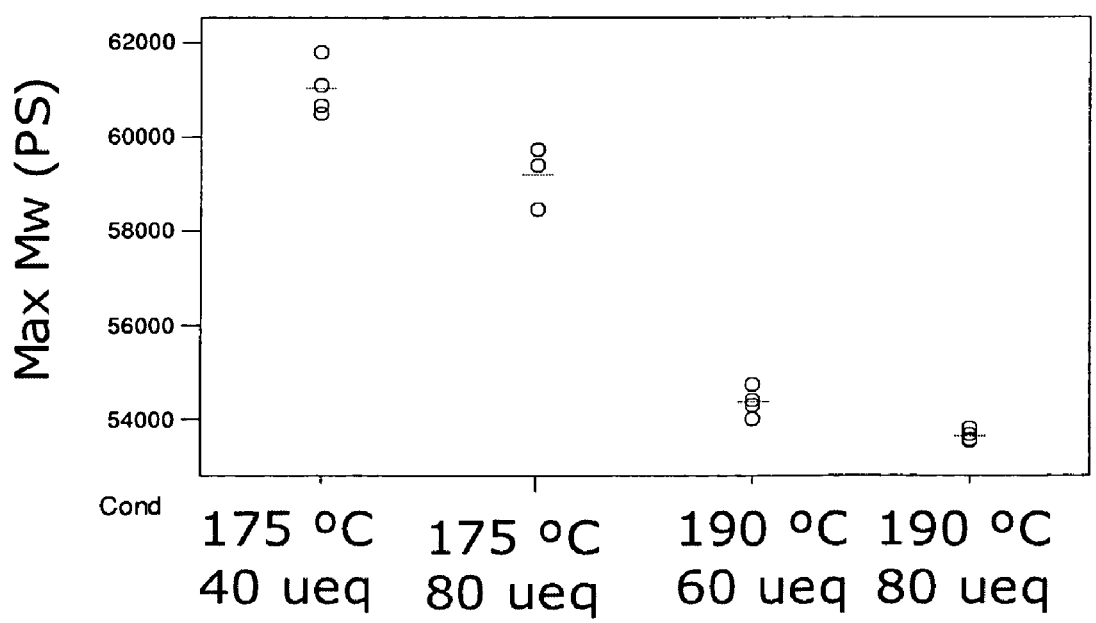
FIG. 10 is a plot of the maximum obtainable polymer molecular weight (determined by relative to polystyrene standards) as a function of reactor temperature and catalyst concentration in microequivalents of sodium hydroxide per equivalent of BMSC for each of the four runs described in Table 6.

FIG. 10 is a plot of the maximum molecular weights (relative to polystyrene standards) obtainable of the polymer resulting from each of the four runs in Table 6. As is illustrated in FIG. 10, higher molecular weight was observed when the temperature of CSTR-1 was 175° C. than when CSTR-1 was at 190° C. In addition, higher maximum molecular weight was observed when less sodium hydroxide was used. Specifically, at 175° C., the maximum Mw of the polycarbonate was 61,000 g/mol when 40 µeq of sodium hydroxide was used, versus an Mw of 59,000 g/mol when 80 µeq of sodium hydroxide was used. Thus, in this particular example, the highest weight average molecular weight was observed at the lower temperature investigated, 175° C., and at the lower level of sodium hydroxide catalyst investigated, 40 µeq.

Figure 11:
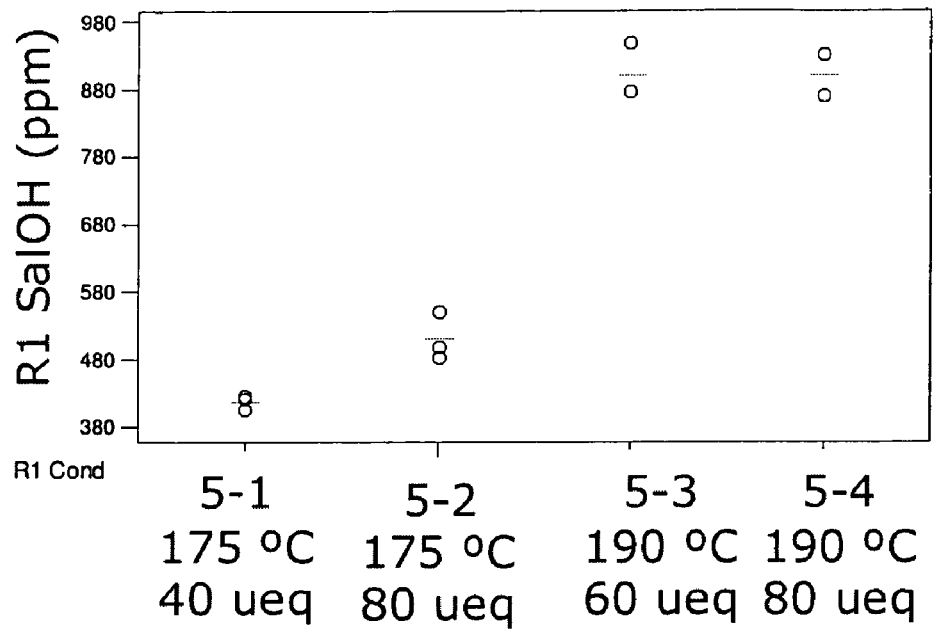
FIG. 11 is a plot of ester-linked terminal group (-Sal-OH) concentration in the oligomerization reactor CSTR-1 as a function of reactor temperature and catalyst concentration in microequivalents of sodium hydroxide per equivalent of BMSC for each of the four runs described in Table 6.

The concentration of -Sal-OH was measured by $^1$H NMR both in the product polymer and in CSTR-1 once the steady state conditions were reached for the different conditions tested. FIG. 11 is a plot of the concentration of -Sal-OH in reactor CSTR-1 (R1) for each run. The data in FIG. 11 illustrate that at the higher process temperature investigated, 190° C., the concentration of -Sal-OH in CSTR-1 was higher than that observed when the process temperature was 175° C. At 175° C. the concentration of -Sal-OH in CSTR-1 was lower at the lower concentration of catalyst investigated, 40 µeq. At 190° C. the concentrations of -Sal-OH observed at the higher and the lower concentration of catalyst are the same within the error of the measurement system.

Figure 12:
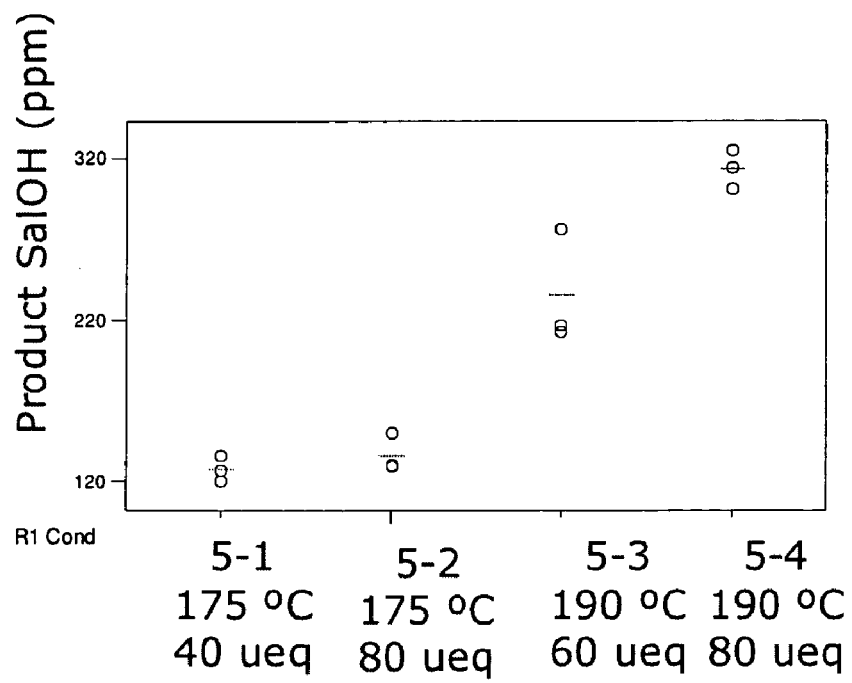
FIG. 12 is a plot of the concentration of -Sal-OH groups in the product polymer as a function of reactor temperature and catalyst concentration in microequivalents of sodium hydroxide per equivalent of BMSC for each of the four runs described in Table 6.

FIG. 12 is a plot of the concentration of -Sal-OH groups in the product polymer for each run 5-1 to 5-4. The data in FIG. 12 illustrates that at the higher process temperature investigated, 190° C., the concentration of -Sal-OH groups in the product polymer was higher than that observed when the process temperature was 175° C. In addition, at 190° C. the concentration of -Sal-OH was higher in the product polymer at the higher concentration of catalyst investigated, 80 µeq. At 175° C., the concentration of -Sal-OH in the product polymer was also higher at the higher concentration of catalyst investigated, 80 µeq. Thus, lower -Sal-OH concentration in the product polymer was unexpectedly observed at the lower process temperature (175° C.) and at the lower catalyst concentration, 40 µeq.

Figure 13:
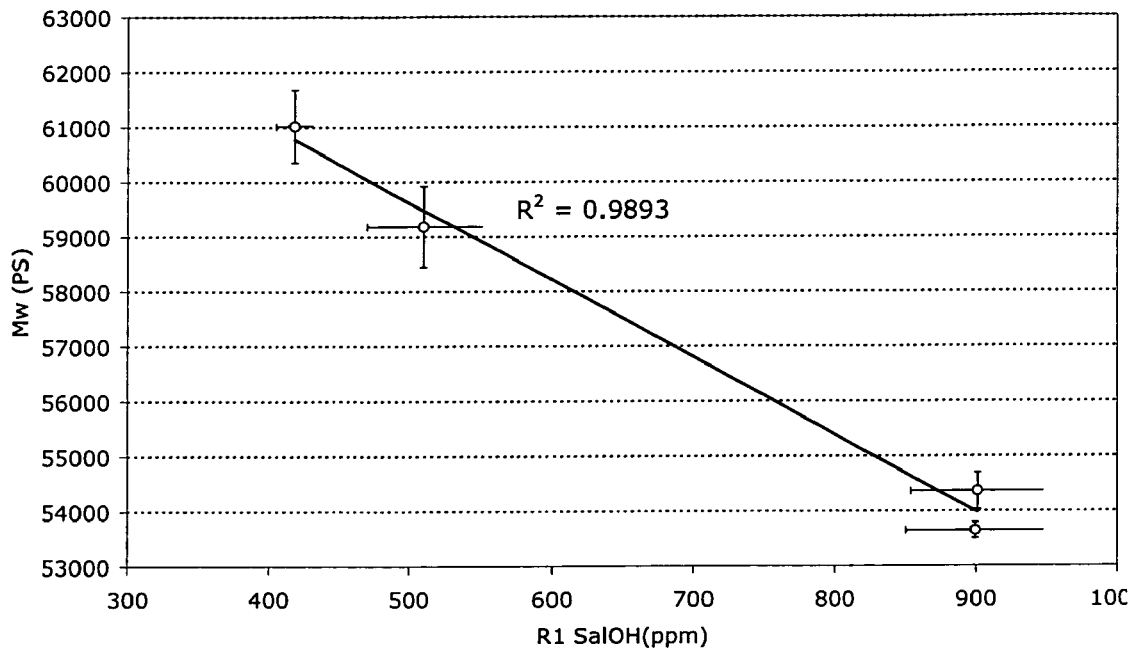
FIG. 13 is a plot of the maximum weight average molecular weight of the resulting polymer (determined by GPC relative to polystyrene standards) and the concentration of -Sal-OH in CSTR-1.

The results presented in FIGS. 11 and 12 can be combined as is illustrated in FIG. 13, which is a plot of the maximum weight average molecular weight of the resulting polymer and the concentration of -Sal-OH in CSTR-1. Surprisingly, the weight average molecular weight and concentration of -Sal-OH in CSTR-1 are correlated, as quantified by the correlation coefficient (calculated to be 0.9893). The data in FIG. 13 illustrates that higher weight average molecular weight was observed at lower concentrations of -Sal-OH in CSTR-1.

Example 5

The process described in Example 4 was repeated, except that the concentration of -Sal-OH was measured in the first CSTR (R1), the second CSTR (R2) and in the product polymer. In the samples taken from CSTRs (R1) and (R2), the samples for analysis were taken once the steady state conditions were achieved for each of the runs. The results are shown in Table 7. These results are also plotted in FIG. 14.

TABLE 7

| R1 Conditions | [-Sal-OH]* in R1 (ppm) | [-Sal-OH]* in R2 (ppm) | [-Sal-OH]* in polycarbonate (ppm) |
|---|---|---|---|
| 175° C., 40 µeq | 418 | 640 | 128 |
| 175° C., 80 µeq | 510 | 965 | 136 |
| 190° C., 60 µeq | 901 | 1057 | 235 |
| 190° C., 80 µeq | 899 | 1011 | 313 |

*Concentration of -Sal-OH

Figure 14:
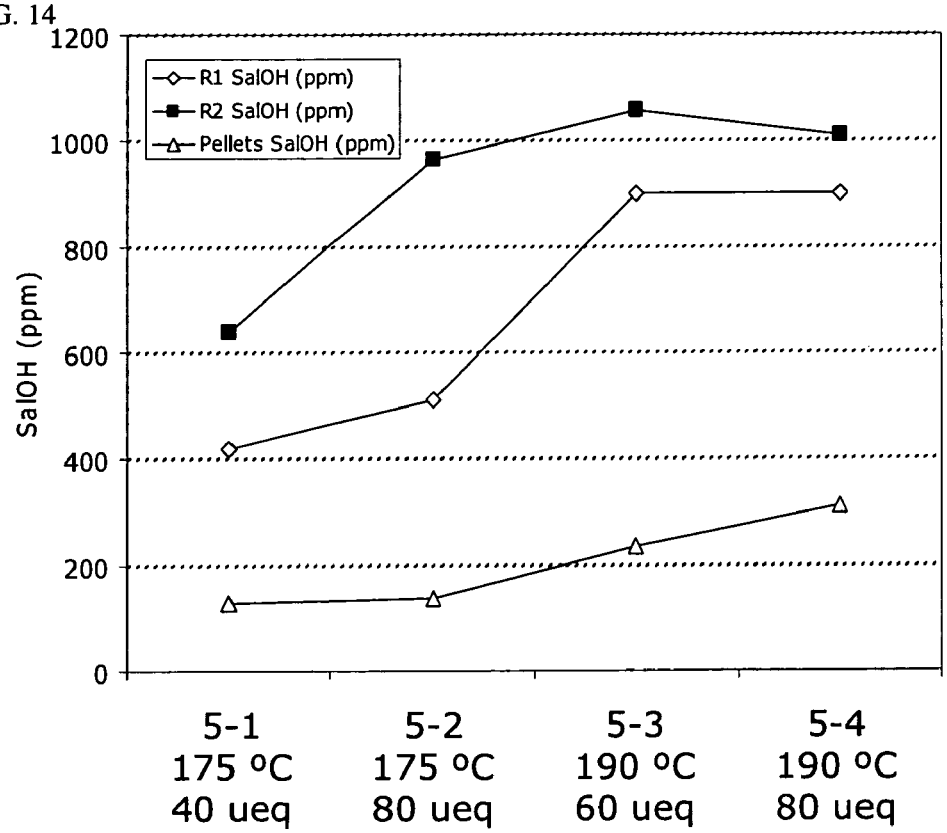
FIG. 14 is a plot of the concentration of ester-linked terminal group (-Sal-OH) in the continuously stirred tank reactors (CSTRs) number 1 and number 2 of a reactor system with two CSTRs in series and the concentration of ester-linked terminal group (-Sal-OH) in the product polymer as a function of reactor temperature and catalyst concentration in microequivalents of sodium hydroxide per equivalent of BMSC for each of the four runs described in Table 6.

The data in Table 7 and in FIG. 14 illustrate that the concentration of -Sal-OH was higher in (R1) and (R2), and the product polymer at the higher process temperature of 190° C. than at the lower process temperature of 175° C. At the lower process temperature, the concentration of -Sal-OH was higher at the higher level of catalyst, 80 µeq of catalyst, than when 40 µeq of catalyst was used. In addition, at the higher process temperature the concentration of -Sal-OH was the same in (R1) and (R2), and higher in the product polymer at the higher level of catalyst (80 µeq). It is notable that the concentration of -Sal-OH increases from (R1) and (R2) and then decreases again in the final product. While not wanting to be bound by theory, a possible mechanism is that the -Sal-OH is formed primarily in the early stages of reaction (e.g., oligomerization) when higher concentrations of methyl salicylate and free OH groups are present and that in later stages of the reaction (e.g., polymerization) some but not all of this fairly unreactive ester-linked terminal group can react further. Therefore the ester-linked terminal group (e.g., -Sal-OH) acts to a large extent as a chain-stopping end group.

Example 6

Reverse Ratio

To evaluate the effect of the ratio between the moles of carbonate and the moles of dihydroxy compound, polycarbonate was prepared using the composition of Example 3. In this example the concentration of BMSC was varied upstream of the reactive extruder. The concentration of BMSC was decreased so that the reaction started under "reverse ratio" conditions, i.e., where the moles of carbonate are lower than the moles of the sum of the dihydroxy and diacid compounds, and ended under "normal ratio" conditions.

Figure 15:
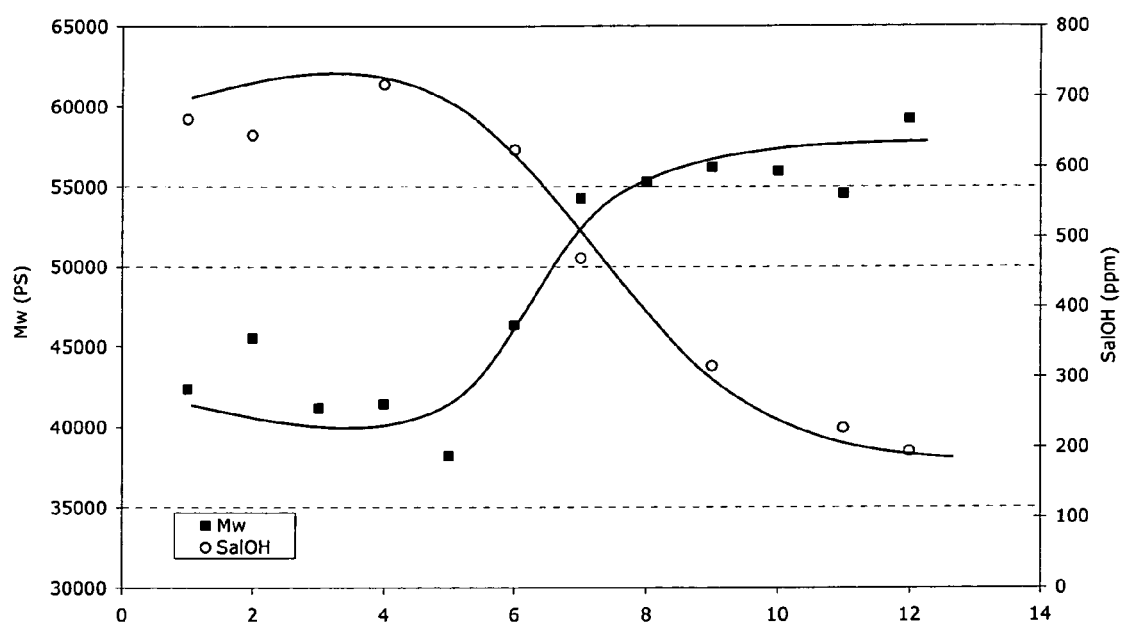
FIG. 15 is a plot of polycarbonate weight average molecular weight (determined by GPC, relative to polystyrene standards) and the concentration of -Sal-OH terminal groups in the product polycarbonate as the reaction ratio was varied from reverse to normal ratio.

The weight average molecular weight of polycarbonate collected as the BMSC concentration was varied from 0.991 moles of BMSC per mole of isosorbide, C36 diacid, and bisphenol A to 1.004 moles of BMSC per mole of isosorbide, C36 diacid and bisphenol A is illustrated in FIG. 15. Also plotted in FIG. 15 is the concentration of -Sal-OH terminal groups in the product polycarbonate. Surprisingly, when the reaction was run under reverse ratio conditions, the -Sal-OH concentration was higher than when the reaction was run under normal ratio conditions. In addition, the molecular weight of the polymer was higher when the reaction was run under normal ratio conditions than when the reaction was run under reverse ratio conditions. This result is particularly surprising because there has been no prior disclosure of the relationship between -Sal-OH concentration, molar ratio of the reactants, and the molecular weight of the resulting polymer. Thus, when the reaction was run under normal ratio conditions, the concentration of -Sal-OH was reduced and molecular weight of up to 55,000 g/mol as determined by gel-permeation chromatography relative to polystyrene standards was observed.

Example 7

Acid Quenching

In the above Examples, it was unexpectedly observed that reducing the amount of sodium hydroxide catalyst resulted in an increase in the molecular weight of the product polycarbonate. It was also observed that a reduction of the amount of sodium hydroxide catalyst increased the concentration of the chain-stopping terminal group -Sal-OH. Analysis of the isosorbide and C36 diacid monomers showed, unexpectedly, that they contained significant amounts of sodium as an impurity. Because it is not known in what form the sodium is present, nor whether this would show any activity, it was decided to carry out some additional tests speculating that part of the sodium would act was sodium hydroxide catalyst. It was surprisingly found that quenching a portion of the sodium impurities by addition of acid resulted in a higher molecular weight polycarbonate.

The set-up of Example 1 was used in this experiment to investigate the acid quenching effect on isosorbide compositions. The glass reactor was charged with isosorbide (10.95 g) and BMSC (25.00 g). After deoxygenation no sodium hydroxide catalyst was added, but instead different amounts of acid were added, as described in Table 9, to quench part of the sodium in the isosorbide (100 µl, 78 µeq (micromoles HCl based on mole of IS)). In another run, the quenching by HCl was omitted. The temperature and pressure profile disclosed in Table 8 was then applied.

TABLE 8

| Line | Time (minutes) | Temperature (° C.) | Pressure (kPa) | Comment |
|---|---|---|---|---|
| 1 (Start) | 0 | 170° C. | 100 | |
| 2 | 6 | | | Start stirrers at 300 rpm |
| 3 | 15 | 230 | | |
| 4 | 30 | | 50 | |
| 5 | 50 | 270 | 0 | |
| 6 (Stop) | 64 | 25 | | Vent |

The polycarbonates were analyzed by GPC to determine the molecular weight of the polymer (expressed as PC molecular weight) and by NMR to determine the concentration of —IS-Sal-OH. The results are shown in Table 9. Included in Table 9 are calculated weight average molecular weights (Cal. Mw (PS)) based on polystyrene standards, calculated based on the weight average molecular weight determined using polycarbonate standards as described above.

TABLE 9

| Run | Acid Added | [Na remaining]* (µeq) | Mw (PC) (g/mol) | Cal. Mw (PS) (g/mol) | [—IS-Sal-OH] (ppm) |
|---|---|---|---|---|---|
| 8-1 | 0 µeq HCl | 92 µeq | 20800 | 38755 | 2206 |
| 8-2 | 78 µeq HCl | 14 µeq | 25248 | 49180 | 1674 |

*Na remaining after quenching by HCl, after line 2 of conditions of Table 8

Surprisingly, when an acid, specifically HCl, was added to the reaction mixture, the molecular weight of the polycarbonate increased. In particular, as disclosed in Table 9, the molecular weight of the product polycarbonate increased from 20,800 g/mol in Example 8-1 to 25,248 g/mol in Example 8-2, where 78 µeq of HCl was added to the reaction. In addition, unexpectedly, addition of HCl resulted in a decrease in the concentration of the chain-stopping terminal groups, —IS-Sal-OH from 2206 ppm in Example 8-1 to 1674 ppm in Example 8-2.

The singular forms "a," "an," and "the" include plural referents unless the context clearly dictates otherwise. Unless defined otherwise, technical and scientific terms used herein have the same meaning as is commonly understood by one of skill in the art. The endpoints of all ranges directed to the same component or property are inclusive and independently combinable (e.g., ranges of "less than or equal to 25 wt %, or, more specifically, 5 wt % to 20 wt %," is inclusive of the endpoints and all intermediate values of the ranges of "5 wt % to 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). Where used, wavy bonds in structural formulas indicate single bonds with unspecified stereochemistry.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method for the manufacture of an aliphatic polycarbonate, comprising:

melt reacting an ester-substituted diaryl carbonate of the formula:

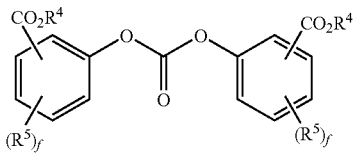

wherein
each $R^4$ is independently a $C_{1-20}$ aliphatic group, $C_{4-20}$ cycloaliphatic group, or $C_{4-20}$ aromatic group,
each $R^5$ is independently a halogen atom, cyano group, nitro group, $C_{1-20}$ aliphatic group, $C_{4-20}$ cycloaliphatic group, or $C_{6-18}$ aromatic group, and
each f is independently 0 to 4,
with a multifunctional compound of the formula:

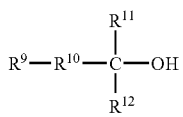

wherein
$R^{10}$ is a chemical bond, a $C_{1-40}$ hydrocarbon that can be unsubstituted or substituted with a hydroxy, carboxy, $C_1$-$C_{22}$ alkoxycarbonyl, halogen, $C_{2-20}$ olefin, $C_{1-20}$ alkylether, or $C_4$-$C_{30}$ polyoxyalkylene in which the alkylene groups each independently comprise 2 to 6 carbon atoms,
$R^{11}$ and $R^{12}$ are each independently a hydrogen or a $C_1$-$C_{40}$ hydrocarbon that can be unsubstituted or substituted with a hydroxyl, carboxy, $C_1$-$C_{22}$ alkoxycarbonyl, halogen, $C_{1-20}$ olefin, $C_{1-20}$ alkylether, or $C_4$-$C_{30}$ polyoxyalkylene functionality in which the alkylene groups contain 2 to 6 carbon atoms, and optionally wherein at least two of $R^{10}$, $R^{11}$, and $R^{12}$ together form a $C_2$-$C_{40}$ monocyclic, bicyclic, or tricyclic ring system optionally substituted with a heteroatom in a ring, and
$R^9$ is a hydroxy or $C_1$-$C_{22}$ alkoxycarbonyl group;
to form a first oligomer having a weight average molecular weight of 4,000 to 12,000 g/mol, measured using gel permeation chromatography using polystyrene standards, and comprising less than 2,000 ppm of an ester-linked terminal group of the formula:

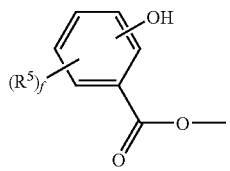

wherein each $R^5$ is independently a halogen atom, cyano group, nitro group, $C_{1-20}$ aliphatic group, $C_{4-20}$ cycloaliphatic group, or $C_{6-18}$ aromatic group, and f is 0 to 4, as determined by $^1$H NMR; and
melt polymerizing the first oligomer in the presence of a transesterification catalyst to form the aliphatic polycarbonate.

2. The method of claim 1, wherein the ester-substituted diaryl carbonate is of the formula:

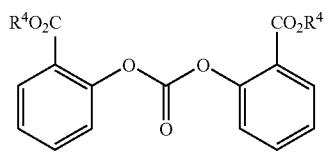

wherein each $R^4$ is independently a $C_{1-20}$ aliphatic group, $C_{4-20}$ cycloaliphatic group, or $C_{4-20}$ aromatic group, and the ester-linked terminal group is of the formula:

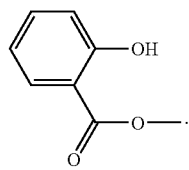

3. The method of claim 1, wherein $R^{10}$ is a chemical bond; and $R^{11}$ and $R^{12}$ are each independently a hydrogen or a $C_1$-$C_{40}$ hydrocarbon that can be unsubstituted or substituted with an olefin or an ether, optionally wherein $R^{11}$ and $R^{12}$ together form a monocyclic, bicyclic, or tricyclic ring system optionally substituted with a heteroatom in a ring.

4. The method of claim 3, wherein $R^9$ is hydroxy.

5. The method of claim 4, wherein the multifunctional compound is an isosorbide of the formula:

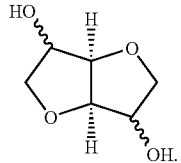

6. The method of claim 4, wherein the multifunctional compound is a C36 diol of the formula

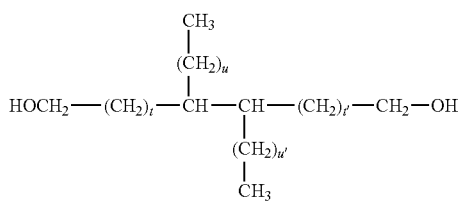

wherein t and t' are each independently 0 to 30, u and u' are each independently 0 to 30, and the sum t+t'+u+u' is 30.

7. The method of claim 1, wherein the ester-linked terminal group is linked to a terminal group derived from a monomer used to form the polycarbonate backbone.

8. The method of claim 7, wherein the ester-linked terminal group is linked to a terminal isosorbide group, which together have the formula

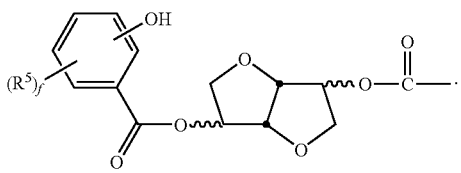

9. The method of claim 1, wherein the multifunctional compound comprises less than or equal to 2,000 ppb by weight of an alkali metal.

10. The method of claim 1, wherein the molar ratio of the ester-substituted diaryl carbonate to the total moles of the multifunctional compound and an optional aromatic dihydroxy compound is greater than 1.

11. The method of claim 1, wherein the transesterification catalyst is present in an amount of less than or equal to 250 micromoles per equivalent of the ester-substituted diaryl carbonate.

12. The method of claim 1, further comprising adding a first portion of a catalyst during melt reacting to form an oligomer and a second portion of a catalyst during melt polymerizing.

13. The method of claim 1, wherein the transesterification catalyst comprises $Na_2HPO_4$, $NaH_2PO_4$, $NaH_2PO_3$, $Na_2HPO_3$, $NaHSO_4$, $Na_2SO_4$, or a combination comprising at least one of the foregoing transesterification catalysts.

14. The method of claim 1, further comprising removing an ester-substituted phenol byproduct during the melt reacting.

15. The method of claim 1, further comprising removing an ester-substituted phenol byproduct during the melt polymerizing.

16. The method of claim 1, further comprising adding an acid (a) to the ester-substituted diaryl carbonate, (b) to the first multifunctional compound, (c) during the melt reacting to form an oligomer, (d) during the melt polymerizing, or (e) a combination comprising at least one of the foregoing.

17. The method of claim 16, wherein the acid is sulfuric acid, present in an amount greater than or equal to 1 mole per mole of alkali metal.

18. The method of claim 1, wherein the melt reacting is at a temperature and for a time effective to form the oligomer and minimize formation of the ester-linked terminal group in the oligomer.

19. The method of claim 18, wherein the melt reacting is at a maximum temperature of 220° C. to 320° C., for a maximum time of 0.5 minutes to 30 minutes.

20. The method of claim 18, wherein the ester-linked terminal group is present an amount of less than or equal to 2,000 ppm by weight of the polycarbonate, as determined by $^1$H NMR.

21. The method of claim 1, wherein the polycarbonate comprises greater than or equal to 50 mole percent of carbonate units derived from the reaction of the ester-substituted diaryl carbonate and the multifunctional compound.

22. The method of claim 1, wherein the polycarbonate has a weight average molecular weight of greater than or equal to 25,000 grams per mole as determined by gel permeation chromatography relative to polystyrene standards.

23. The method of claim 1, further comprising melt reacting the ester-substituted diaryl carbonate with an additional multifunctional compound different from the multifunctional compound, an aromatic dihydroxy compound, a dicarboxylic acid, or a combination comprising at least one of the foregoing.

24. The method of claim 1, wherein the multifunctional compound is a combination of isosorbide and a C36 diol, the aromatic dihydroxy compound is bisphenol A, and the dicarboxylic acid is a C36 dicarboxylic acid.

25. The method of claim 1, wherein the multifunctional compound is isosorbide, and the method further comprises melt reacting the ester-substituted diaryl carbonate with bisphenol A and a C36 dicarboxylic acid.

26. An aliphatic polycarbonate manufactured by the method of claim 1.

27. An article comprising the aliphatic polycarbonate manufactured by the method of claim 1.

28. A method for the manufacture of an aliphatic polycarbonate, comprising:
melt reacting an ester-substituted diaryl carbonate of the formula:

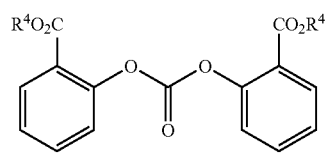

wherein each $R^4$ is independently a $C_{1-20}$ aliphatic group, $C_{4-20}$ cycloaliphatic group, or $C_{4-20}$ aromatic group, with an isosorbide of the formula:

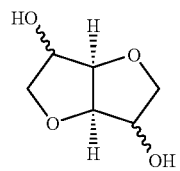

to form a first oligomer having a weight average molecular weight of 4,000 to 12,000 g/mol, measured using gel permeation chromatography using polystyrene standards, and comprising less than 2,000 ppm of an ester-linked terminal group of the formula:

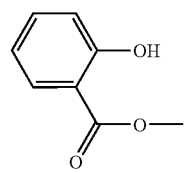

as determined by $^1$H NMR; and
melt polymerizing the first oligomer in the presence of a transesterification catalyst to form the aliphatic polycarbonate.

29. An aliphatic polycarbonate, comprising units of the formula

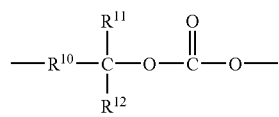

wherein
- $R^{10}$ is a chemical bond, a $C_{1-40}$ hydrocarbon that can be unsubstituted or substituted with a hydroxy, carboxy, $C_1$-$C_{22}$ alkoxycarbonyl, halogen, $C_{2-20}$ olefin, $C_{1-20}$ alkylether, or $C_{4-30}$ polyoxyalkylene in which the alkylene groups each independently comprise 2 to 6 carbon atoms,
- $R^{11}$ and $R^{12}$ are each independently a hydrogen or a $C_{1-40}$ hydrocarbon that can be unsubstituted or substituted with a hydroxyl, carboxy, $C_{1-22}$ alkoxycarbonyl, halogen, $C_{2-20}$ olefin, $C_{1-20}$ alkylether, or $C_{4-30}$ polyoxyalkylene functionality in which the alkylene groups contain 2 to 6 carbon atoms, and optionally wherein at least two of $R^{10}$, $R^{11}$, and $R^{12}$ together form a $C_{2-40}$ monocyclic, bicyclic, or tricyclic ring system optionally substituted with a heteroatom in a ring; and an ester-linked terminal group of the formula:

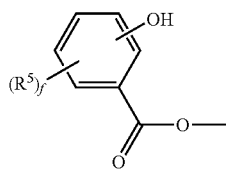

wherein each $R^5$ is independently a halogen atom, cyano group, nitro group, $C_{1-20}$ aliphatic group, $C_{4-20}$ cycloaliphatic group, or $C_{6-18}$ aromatic group, and f is 0 to 4, in an amount of up to 2000 ppm as determined by $^1$H NMR, and based on the parts by weight of the aliphatic polycarbonate.

30. The polycarbonate of claim 29, comprising carbonate units of the formula

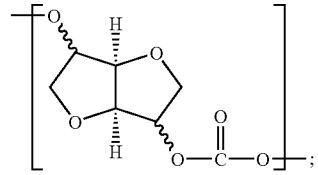

and less than 2,000 ppm, as determined by $^1$H NMR, of an ester-linked terminal group of the formula:

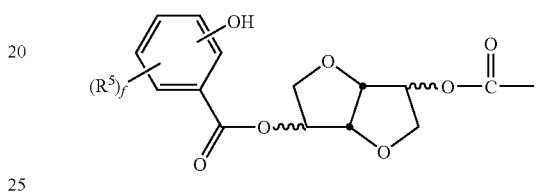

wherein f is zero and the hydroxyl group is ortho to the carbonyl.

* * * * *